United States Patent
Sullivan et al.

(10) Patent No.: US 11,896,917 B2
(45) Date of Patent: Feb. 13, 2024

(54) FURNITURE AND LARGE-SCALE PLAY STRUCTURES HAVING IDEAL MODULARITY

(71) Applicant: Pollywog Toys, LLC, Washington, DC (US)

(72) Inventors: Abigail Sullivan, Washington, DC (US); Christian W. Brown, Loveland, CO (US)

(73) Assignee: Pollywog Toys, LLC, McLean, VA (US)

( * ) Notice: Subject to any disclaimer, the term of this patent is extended or adjusted under 35 U.S.C. 154(b) by 771 days.

(21) Appl. No.: 17/006,362

(22) Filed: Aug. 28, 2020

(65) Prior Publication Data

US 2021/0060448 A1   Mar. 4, 2021

Related U.S. Application Data

(60) Provisional application No. 62/894,587, filed on Aug. 30, 2019.

(51) Int. Cl.
*A63H 33/04* (2006.01)
*A63H 33/00* (2006.01)
(Continued)

(52) U.S. Cl.
CPC ......... *A63H 33/044* (2013.01); *A63H 33/008* (2013.01); *A63H 33/107* (2013.01); *A47B 47/0066* (2013.01); *A47B 47/0091* (2013.01)

(58) Field of Classification Search
CPC .. A63H 33/044; A63H 33/008; A63H 33/107; A63H 33/3055; A47B 47/0066;
(Continued)

(56) References Cited

U.S. PATENT DOCUMENTS

| | | |
|---|---|---|
| 1,336,628 A | 4/1920 | Hall |
| 1,648,706 A | 11/1927 | Walker |
| (Continued) | | |

FOREIGN PATENT DOCUMENTS

| | | |
|---|---|---|
| AU | 2012254205 B2 | 11/2012 |
| DE | 2338936 A1 | 2/1975 |
| (Continued) | | |

OTHER PUBLICATIONS

International Search Report and Written Opinion, dated Nov. 20, 2020, for corresponding International Application No. PCT/US20/48543.

*Primary Examiner* — Nini F Legesse
(74) *Attorney, Agent, or Firm* — Build IP, LLC; Robert V. Donahoe

(57) ABSTRACT

A method for building large-scale play structures having an ideal modularity is provided. The method includes providing panels having a thickness, a planar-quadrangle shape including a length, a width and four chamfered edges with a set of holes located along each edge, the holes located at a fixed interval relative to one another, the fixed interval providing a unit of length, a fixed-location fastening element located in each of the holes, respectively; providing a plurality of movable fastening elements each including a hand-grip to allow the respective movable fastening element to be moved between an unsecured position and a secured position without the use of tools when received by any one of the plurality of fixed-location fastening elements; and employing the fasteners to secure a plurality of the panels to one another to provide a structure that has an overall height, an overall length and an overall width, the structure including at least a pair of panels oriented one above the other and at least a pair of panels located at the same elevation and secured at right angles to one another.

19 Claims, 23 Drawing Sheets

(51) Int. Cl.
  *A63H 33/10* (2006.01)
  *A47B 47/00* (2006.01)

(58) Field of Classification Search
  CPC ........ A47B 47/0091; A47B 2220/0072; A47B
          47/042; A47B 47/047; F16B 12/2009;
          F16B 12/22; F16B 12/46
  USPC ......... 446/105, 108–116, 122–124, 476, 478
  See application file for complete search history.

(56) References Cited

U.S. PATENT DOCUMENTS

| | | | |
|---|---|---|---|
| 2,551,071 A | 5/1951 | Tyng | |
| 3,120,078 A | 2/1964 | Bessinger | |
| 3,132,443 A | 5/1964 | Kuhn | |
| 3,168,793 A | 2/1965 | Gibson | |
| 3,262,405 A | 7/1966 | Sutton | |
| 3,547,491 A | 12/1970 | Bovasso | |
| 3,826,206 A | 7/1974 | Ruggles | |
| 4,685,892 A * | 8/1987 | Gould | A63H 33/062 |
| | | | 446/116 |
| 5,754,995 A | 5/1998 | Behrendt | |
| 5,910,037 A * | 6/1999 | Bach | A63H 3/52 |
| | | | 446/124 |
| 5,971,187 A | 10/1999 | Clee et al. | |
| 6,615,999 B1 | 9/2003 | Culp | |
| 6,769,369 B1 | 8/2004 | Brandenberg | |
| 9,506,489 B2 | 11/2016 | Ko | |
| 9,554,645 B2 | 1/2017 | Urheim | |
| 9,615,663 B2 | 4/2017 | Davis | |
| 9,731,214 B2 | 8/2017 | Lindaman | |
| 10,065,763 B2 * | 9/2018 | Wilcox | B65D 21/086 |
| 10,532,850 B2 * | 1/2020 | Su | B65D 11/1833 |
| 2005/0200250 A1 | 9/2005 | Zillman et al. | |
| 2007/0281580 A1 * | 12/2007 | Sambenedetto | A63H 33/08 |
| | | | 446/124 |
| 2014/0315466 A1 * | 10/2014 | Murtagh | G09B 25/04 |
| | | | 446/124 |
| 2016/0051903 A1 * | 2/2016 | Nilsson | A63H 33/10 |
| | | | 446/108 |
| 2016/0258461 A1 | 9/2016 | Muller et al. | |

FOREIGN PATENT DOCUMENTS

| | | |
|---|---|---|
| ES | 1087830 B2 | 8/2013 |
| NL | 2012947 B2 | 4/2015 |
| WO | 200226339 A1 | 4/2002 |

* cited by examiner

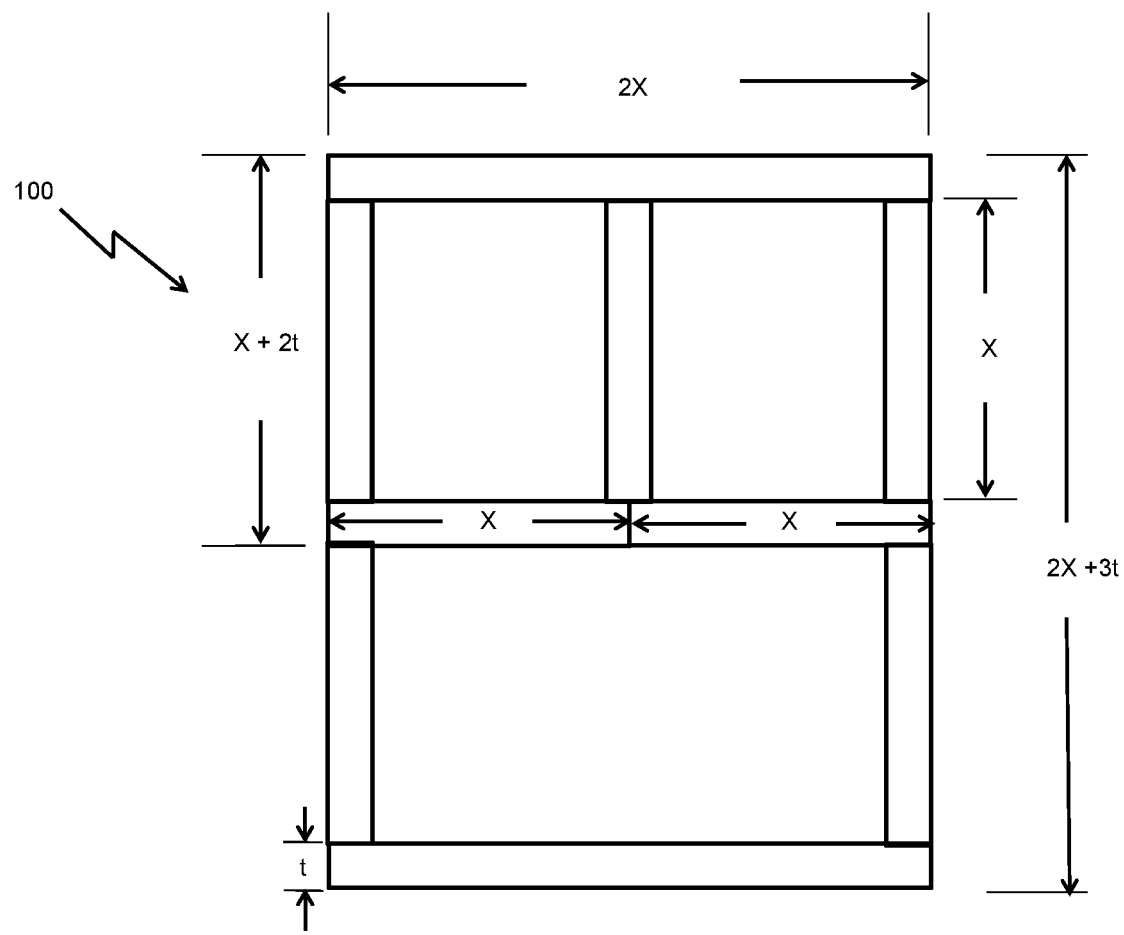
FIG.1 – Prior Art

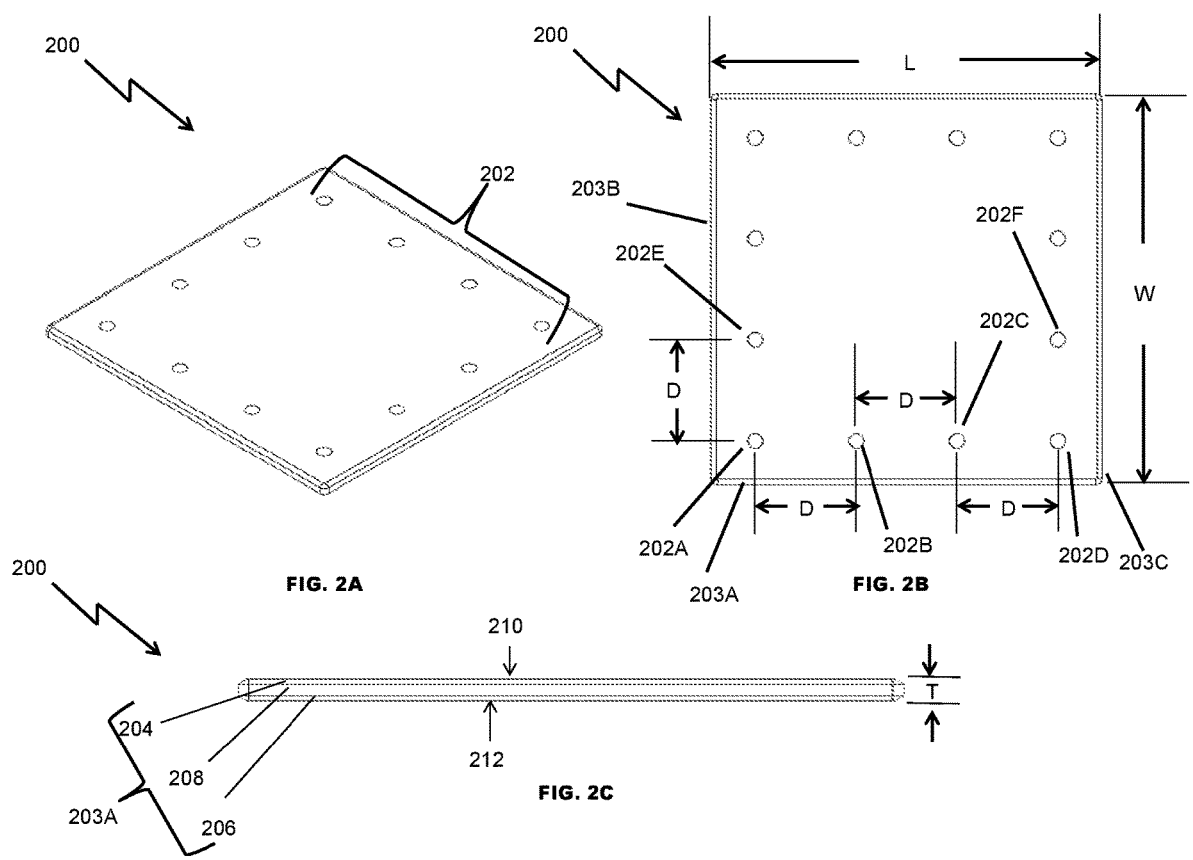

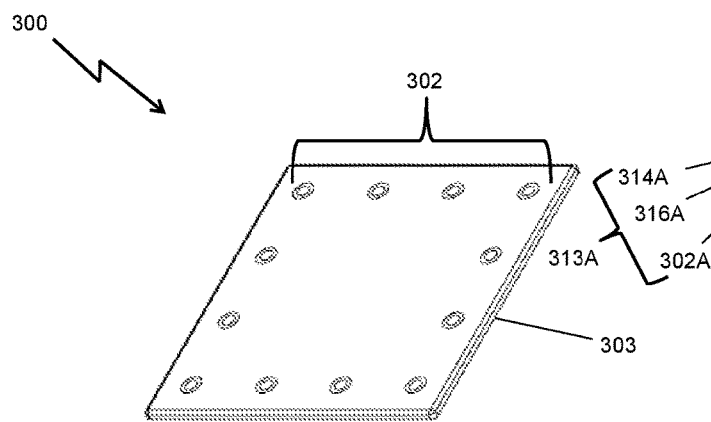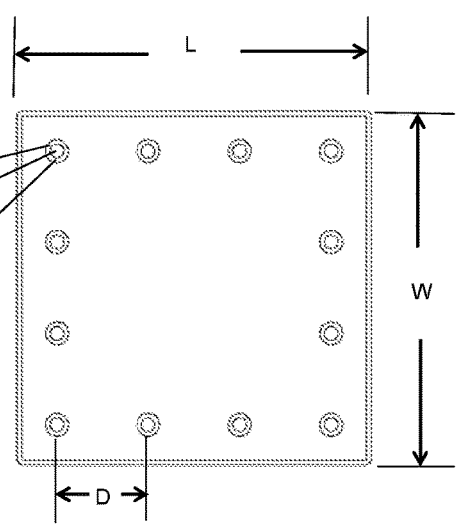
FIG. 3A  FIG. 3B

FURNITURE AND LARGE-SCALE PLAY STRUCTURES HAVING IDEAL MODULARITY

BACKGROUND OF INVENTION

1. Field of Invention

This invention relates generally to apparatus, systems and methods for modular furniture and large-scale play structures. More specifically, at least one embodiment, relates to a building system having ideal modularity.

2. Discussion of Related Art

Play building-sets with a fixed set of building components suitable for children to build structures are well known. Some of these building-sets do not use fasteners for assembly. Instead, they may employ sliding engagement in combination with some form of friction fit. For example, LEGO plastic building bricks include structure built into each building component that allows them to be secured to one another when they are aligned and pressed together. However, many other building-sets employ actual fasteners to assemble components. Among these, many different types of fastening systems are used. Some approaches require the use of tools such as allen wrenches or screw drivers to assemble the structures. Some include fasteners with two separate loose components that secure to one another. Others include a loose fastener in combination with a fastener-receiving element, for example, a receiving element built into a frame to which the building components are attached. In general, building systems that include separate fasteners fail to properly address the needs of users who are children because they require tools, other elements that are too difficult to use and/or do not support building structures that are truly modular.

Often, the play building-sets are referred to as modular because they can be employed to build multiple different structures with the same set of building components. However, many of the building-sets include a limited number of shapes and form factors that do not provide a universal solution for the needs of users. That is, the basic building components may have limited utility because the component shape includes built-in features, for example, a 90 degree bend that is only suitable in a limited number of building structures that require the shape. Similarly, the basic building components may not be assembled with a repeating unit of length or a multiple thereof because of the manner in which the basic building component is manufactured and also the manner in which the basic building components are attached to one another.

Traditional approaches are not truly modular because they cannot be used to build structures that maintain the repeating unit of length or multiple thereof as the dimensions of the structure are increased. For example, where panels are the basic building component in a building set they may have a known length L. Prior approaches do not permit multiple panels to be assembled into basic shapes such as squares, rectangles and shelves while maintaining the length of each side of the structure as a length L or L(N) where N equals a multiplier, for example, a positive integer.

Referring to FIG. 1, a prior art structure 100 illustrates a fundamental problem found in prior approaches. The structure 100 is a set of shelves with a full length lower shelf and an upper shelf with two compartments that have equal dimensions. The structure is assembled using two types of panels. The first type of panel has a dimension that equals a length X. The second type of panel has a dimension that equals a length 2X. The structure 100 is assembled with four exterior sides. Both the top side and the bottom side are constructed from a respective panel with a length of 2X. The middle shelf is constructed with two panels with a length of X arranged side by side on their edge. The divider is constructed using a single panel with a length X orientated vertically between the middle shelf and the upper shelf. Each of the panels includes a thickness t.

Although each of the panels is provided with a length X or multiple thereof, the structure 100 cannot be constructed in a modular fashion with the panels. In particular, the panels engage with one another at right angles in a manner that causes the structure 100 to have dimensions of the height that are offset from one another. The offset increases as the size of the structure grows (i.e., as the structure is scaled). For example, the top shelf and the middle shelf together have an overall height of X+2t and a width of 2X. Thus, the height and width are not modular because they fundamentally differ from one another because, for example, the height is not a multiple of the unit of length X. That is, the height includes the offset dimension of 2t while the width does not include any offset value. As illustrated in FIG. 1, the combined structure 100 also including the lower shelf in addition to the upper, and the middle shelves has an overall height of 2X+3t and a width of 2X. Here, the offset has increased from 2t to 3t with the addition of another level of shelving. The discrepancy increases further with an addition of further levels of shelving. The preceding cannot be employed to achieve modularity. For example, the continuing change in dimensions with the addition of each new level of shelving also creates a change in the spacing of some fastener locations relative to others that may be included in a series of panels included in a building structure.

SUMMARY OF INVENTION

Therefore, there is a need for apparatus, systems and methods that provide truly modular systems that include core components that are constructed in a standard unit of length or a multiple thereof. There is also a need to provide building systems that are truly universal. In the various embodiments described herein, these building systems give the user an opportunity to assemble a wide variety of different structures using the same set of components. Some of these embodiments allow the building systems to be assembled without the use of tools. That is, the components included in the building systems are fastened to one another with a tool-free fastener system. In further embodiments, the tool-free fastener system is employed in a building system that does not include any elements that are employed as framing or as a support structure for the components when assembled to one another. According to some embodiments, the components included in the building systems are fastened to one another with a tool-free fastener system including tool-free fasteners that are actuated by hand to secure building components to one another.

The embodiments described herein provide a consistent and repeated spacing of the locations for fasteners used to secure building components to one another. In addition, to provide an ideal modularity, these embodiments maintain the dimensions of building components and the separation distance between adjacent fastener locations as a multiple of one another. Further, the building components, such as panels include features as a part of each edge that allow for panels to be attached edgewise to one another at any angle within a predefined range of attachment-angles while maintaining the ideal modularity of the attached panels relative to one another.

In mathematics, a plane is a flat, two-dimensional surface that is infinitely thin. As used herein, the term "ideal plane" refers to a plane that is centrally located within a building component such as a panel. Applying the concept to hypothetical planar building components (i.e., an infinitely thin panel), components can be attached edgewise in the same plane in a consistent manner to build a structure having the same change in the overall dimensions of the modular structure with the addition of each panel. While the preceding may also be achieved with panels that have a thickness when laid side by side, it is not possible to maintain ideal modularity in the assembly of three dimensional structures. The preceding shortcoming is illustrated in FIG. 1 where an attachment of additional components above or below an existing shelf expands the dimensions of the structure further and further from the ideal. FIG. 1 illustrates that an attachment of prior art building components at 90 degrees relative to one another cannot be completed in a manner such that the three intersecting panels are attached at the intersection of the respective ideal planes. Instead, the panel that is perpendicular is secured to the other panel(s) offset by ½ the thickness of the other panel(s). Various embodiments overcome the shortcomings of prior approaches and allow panels to be attached to one another at a range of angles including 90 degrees at the intersection of the respective ideal plane associated with each. In further embodiments, the range of angles includes angles up to and including 180 degrees.

In further embodiments, these building systems provide apparatus, systems and methods with an ideal modularity. As used herein, "ideal modularity" refers to a building system that includes panels sized and shaped such that structures assembled with the panels increase in height, length and width with the addition of a panel above, adjacent to or attached at right angles to, respectively, an existing panel included in the assembly where the respective increase in height, length or width occurs in a repeatable unit of measure or multiple thereof and the unit of measure is a distance separating adjacent fastener locations in the panels. According to one embodiment, the respective increase in height, length or width is a positive integer multiple of the unit of measure.

According to some embodiments, ideal modularity is achieved by providing planar panels that include edges having opposing chamfers separated by a central planar region that runs both longitudinally and vertically along the panel-edge. According to some embodiments, chamfers allow building components to be attached to one another in a manner that maintains ideal modularity. For example, in one embodiment, chamfers allow building components to be attached to one another in a manner such that they are positioned at angle of less than 90 degrees at a location of their ideal planes.

According to one aspect a building system includes a plurality of panels having a thickness, a planar-quadrangle shape including a length, a width and four chamfered edges with a set of holes located along each edge, a plurality of fixed-location fastening elements located within the holes and a plurality of movable fastening elements. According to one embodiment, the plurality of panels includes four panels including a first panel, a second panel, a third panel and a fourth panel. Further, the holes are located at a fixed interval relative to one another, the fixed interval providing a unit of length. Each movable fastening element includes a hand-grip to allow the respective movable fastening element to be moved between an unsecured position and a secured position without the use of tools when received by any one of the plurality of fixed-location fastening elements. Further, the plurality of panels are configured to assemble at right angles such that four panels are secured together to form a hollow quadrangle-shaped structure when the assembled-panels are viewed edgewise. A distance measured from an outside plane formed by the first panel to an outside plane formed by the second panel provides a first dimension, the second panel located opposite the first panel in the structure. A distance measured from an outside plane formed by the third panel to an outside plane formed by the fourth panel provides a second dimension, the third panel located opposite the fourth panel in the structure, wherein each of the first dimension and the second dimension is an integer multiple of the unit of length.

According to another aspect, a method for building large-scale play structures having an ideal modularity is provided. According to one embodiment, the method includes providing panels having a thickness, a planar-quadrangle shape including a length, a width and four chamfered edges with a set of holes located along each edge, the holes located at a fixed interval relative to one another, the fixed interval providing a unit of length, a fixed-location fastening element located in each of the holes, respectively; providing a plurality of movable fastening elements each including a hand-grip to allow the respective movable fastening element to be moved between an unsecured position and a secured position without the use of tools when received by any one of the plurality of fixed-location fastening elements; and employing the fasteners to secure a plurality of the panels to one another to provide a structure that has an overall height, an overall length and an overall width, the structure including at least a pair of panels oriented one above the other and at least a pair of panels located at the same elevation and secured at right angles to one another. Further, the structure defines a hollow quadrangle-shape when the structure is viewed from above, and the overall height, the overall length and the overall width each provide a respective dimension that is an integer multiple of the unit of length.

Further, there is a need to provide the preceding building systems suitable for their safe use by children. In various approaches, these building systems provide the ease of use required for assembly by children independent of any adult supervision and also meet industry safety standards. In some embodiments, these approaches provide apparatus, systems and methods that comply with the "Standard Consumer Safety Specification for Toy Safety" provided by ASTM International. For example, embodiments provide for hinged attachment of adjacent building components that meets ASTM requirements for pinch clearance through the full range of hinge motion. Further, embodiments described herein provide a hinge structure that prevents unexpected lid-closure caused by gravity in a toy chest configuration. The preceding feature can prevent injuries that would otherwise occur.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 illustrates a prior art structure;

FIGS. 2A-2C illustrate a building component in accordance with one embodiment;

FIGS. 3A and 3B illustrate a building component in accordance with another embodiment;

DETAILED DESCRIPTION

Figure 4A:
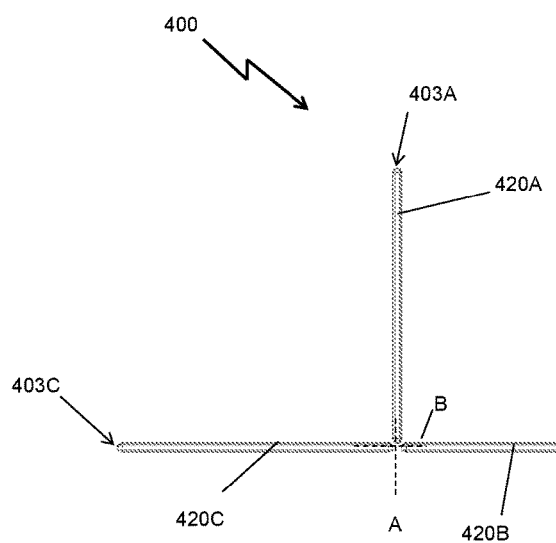
FIG. 4A illustrates a first orientation of multiple panels in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Referring now to FIGS. 2A-2C, a panel 200 is illustrated in accordance with one embodiment. In various embodiments, the panel 200 is included in a building system that allows users to build structures with dimensions that consistently maintain ideal modularity. In some embodiments, the panel 200 is included in a building system created for use by children to build large scale play structures. In other embodiments, the panel 200 is included in a building system created for use building adult-scale furniture.

The panel 200 includes a plurality of holes 202, for example, through holes that are sized and located to receive fastening hardware. The panel 200 is provided in a quadrangle shape that has a length L and a width W. Although the illustrated embodiment is provided in a square shape, the panel 200 can also be provided in an overall rectangular shape. The panel 200 includes four edges in either embodiment. Referring to FIG. 2B, a first edge 203A, a second edge 203B and a third edge 203C are identified.

In various embodiments, the plurality of holes 202 are located along each edge where each hole is spaced a uniform distance apart from adjacent ones of the plurality of holes 202. For example, FIG. 2B illustrates a first hole 202A, a second hole 202B, a third hole 202C and a fourth hole 202D located adjacent to one another along the first edge 203A. Each of the plurality of holes 202A-202D are separated from adjacent holes along the first edge 203A by a distance D. According to this embodiment, both the first hole 202A and the second hole 202D are located at respective corner locations. As a result of their location and the quadrangle shape of the panel 200, the first hole 202A is also located along the second edge 203B adjacent a fifth hole 202E and the fourth hole 202D is also located along the third edge 203C adjacent a sixth hole 202F. Further, the first hole 202A is separated from the fifth hole 202E by a distance D and the fourth hole 202D is separated from the sixth hole 202F by the distance D.

Referring now to FIG. 2C, a thickness T of the panel is illustrated in a view of the first edge 203A of the panel 200. The edge 203A includes a first chamfer 204, a second chamfer 206, an intermediate section 208, a first surface 210 and a second surface 212. Each of the four edges includes the structure shown and described with reference to the first edge 203A illustrated in FIG. 2C.

According to the illustrated embodiment, the first chamfer 204 and the second chamfer 206 are symmetrically located on either side of a planar surface provided by the intermediate section 208. In a further embodiment, the chamfers 204, 206 are selected to support a building system that provides for assembled structures that have ideal modularity. In one embodiment, the chamfers 204, 206 are provided at an angle relative to the adjacent surface 210, 212, respectively, that is equal to or greater than the most acute angle formed by any two panels when connected along adjacent edges to build a structure with the building system. For example, if the most acute angle formed by the panels of a building system is 60 degrees, then each of the first chamfer 204 and the second chamfer 206 are provided at a 30 degree angle. Similarly, if the most acute angle formed by the panels of a building system is 90 degrees, then each of the first chamfer 204 and the second chamfer 206 are provided at not more than a 45 degree angle.

Further, the depth to which the chamfers 204, 206 are cut into the edge 203 can also be selected to provide panels that are attached to one another while maintaining an ideal modularity of structures built with the building system. For example, the panel thickness T equals one half inch and the most acute angle formed by the panels of a building system is 60 degrees. According to this embodiment, each of the first chamfer 204 and the second chamfer 206 are provided at a 30 degree angle to a depth of one quarter inch, respectively. Similarly, each of the first chamfer 204 and the second chamfer 206 are provided at a 45 degree angle to a depth of one quarter inch, respectively, for panels having a thickness T of one half inch used in building systems with a minimum connection-angle of 90 degrees. According to one embodiment, a panel having a thickness of ½ inch includes each of a first chamfer and a second chamfer cut to a depth of 0.2 inches. According to these embodiments, a plane extending from the first chamfer and the second chamfer, respectively, on each of a respective pair of panels fastened to one another as described herein intersect at the same location as the intersection of the ideal planes of the two panels.

As is described in greater detail below, the minimum connection-angle can be established based on the fastening hardware included in the building system. As one example, fixed angle brackets can be included to attach panels at a known angle. As another example, adjustable angle brackets or hinges can be designed to provide a limited range of motion that fixes the minimum connection-angle.

In further embodiments, the length L and width W of the panel 202 are also selected such that an ideal modularity is a result in the structures built with the panels 202. According to one embodiment, the distance D is established as a basic unit of length on which panel dimensions L and W are based. In one embodiment, the panel length L and the panel width W are selected to be a multiple of the distance D, for example, an integer multiple. In other embodiments, the panel length L and the panel width W are selected to be a fractional multiple, for example ½D. In either embodiment, the basic unit of length is established to maintain the ideal modularity and the nominal dimensions of the panel 202 are also decreased by the panel thickness T. That is, both the length L and the width W are reduced by an amount equal to the panel thickness T. The preceding combination of features allows panels to be connected together to build structures that increase in size only by the basic unit of length or multiple thereof as building components are connected together. The embodiments described herein also allow building components to be connected at the intersection of their ideal planes. As is described in greater detail herein, this form of connection allows panels attached to one another by a hinge to move through a range of motion that includes the most acute connection-angle while maintaining ideal modularity.

According to the illustrated embodiment, the plurality of holes 202 are each sized to receive a respective fastening element, for example, a fixed-location fastening element in the form of a pair of inserts that are pressed into engagement with one another within a respective hole. According to the illustrated embodiment, each of the plurality of holes 202 have a constant diameter that extends from the first surface 210 to the second surface 212. The fixed-location fastening element has an overall cylindrical shape such that it can be secured by one or a combination of a friction fit and adhesive within one of the holes 202. As is described in greater detail herein, the fixed-location fastening element can be provided as a single component or two components that are secured together to form the fixed-location fastening element. Once in place, the fixed-location fastening element is positioned to receive a second moveable fastening element that engages structure included in the fixed-location fastening element to secure the two fastening elements together. For example, the fixed-location fastening element can receive and engage the distal end of the moveable fastener. As is described in greater detail herein, the type of fastener that is employed can vary depending on the embodiment. Thus, fastening components can include pins, screws, bolts and clamps. While the fastening components can include standalone elements such as the preceding, further embodiments can include these elements as an integral part of components that provide additional functionality such as brackets, hinges, clamps, furniture legs and handles as some examples.

Referring now to FIGS. 3A and 3B, a panel 300 is illustrated in accordance with another embodiment. The panel 300 includes a plurality of holes 302. In various embodiments, the panel 300 is included in a building system that allows users to build structures with dimensions that consistently maintain ideal modularity. That is, structures assembled using the panels can be scaled by adding sections where each new section increases the overall dimensions of the structure by the same dimension or a multiple thereof. In some embodiments, the panel 300 is included in a building system created for use by children to build large scale play structures. In other embodiments, the panel 300 is included in a building system created for use building adult-scale furniture.

The panel 300 is provided in a quadrangle shape that has a length L and a width W. Although the illustrated embodiment is provided in a square shape, the panel 300 can also be provided in an overall rectangular shape. The panel 300 includes four edges in either embodiment. Referring to FIG. 3A, an edge 303 is identified. According to the illustrated embodiment, the edge 303 includes symmetrical chamfers located on either side of a central planar region as illustrated and described with reference to FIG. 2 and the edge 203A. Further, in various embodiments, the panel 300 includes the combination of features concerning the chamfer angle, the chamfer depth and panel dimensions described above concerning the panel 200. According to these embodiments, a building system in which the panel 300 is employed provides an ideal modularity while increasing safety by avoiding or eliminating pinch points.

In various embodiments, the plurality of holes 302 are located along each edge where each hole is spaced a uniform distance apart from adjacent ones of the plurality of holes. For example, in the illustrated embodiment each of the plurality of holes 302 are separated from adjacent holes by a distance D. In some embodiments, the distance D establishes a basic unit of length for the building system in which the panel is included.

The panel 300 differs from the panel 200 because each of the plurality of holes includes counterboring. According to this embodiment, the fastening element located in each of the plurality of holes 302, respectively, includes a flange at each end. The flanged regions are received within the counterboring to allow the fastener to sit flush with the surface 310, 312 of the panel 300.

As illustrated in FIG. 3B, the hole 302A includes a first fastening element 313A, for example, a fixed-location fastening element, located in the hole 302A. In general, the first fastening element 313A includes structure that allows it to be securely located in the hole 302A. Additionally, the first fastening element 313A includes structure that allows a second fastening element (not shown) to be removably secured within the first fastening element 313A. That is, a fastening element can be moved into engagement with the first fastening element 313A to temporarily secure panels to one another during the process of building a structure from a set of building components that can include a plurality of panels such as the panel 302, a plurality of second fastening elements that may include associated hardware such as brackets, hinges, legs and handles as some examples. A user can construct a customizable structure from these modular building elements. The user can later disassemble the structure by disconnecting the second fastening element(s) from the first fastening element(s) and build a completely different structure that also maintains ideal modularity.

The materials of construction can vary depending on the embodiment. According to one embodiment, the panel 300 is manufactured from wood and the fixed-location fastening element is manufactured from plastic. In another embodiment, the panel 300 is manufactured from plastic. According to this embodiment, the first fastening element described above can be molded within the respective holes. The preceding eliminates the need to manufacture separate components that must be located and secured within the holes.

The embodiments described herein provide a consistent and repeated spacing of the locations for fasteners used to secure building components to one another. In addition, to provide ideal modularity, these embodiments maintain the dimensions of building components and the separation distance between adjacent fastener locations as a multiple of one another. Further, the building components, for example, panels 200, 300 include structural features on each edge that allow for panels attached edgewise to one another to move through a predefined range of motion while maintaining the ideal modularity of the attached-panels relative to one another.

The embodiments illustrated and described with reference to FIGS. 2 and 3 include panels with through-holes sized and configured to receive fastening hardware. In general, the fastening hardware includes a fixed-location element located in the through-hole (for example, an insert) and a movable fastener that is received in the fixed location element to secure a bracket to the panel. While the embodiments illustrated in FIGS. 2 and 3 are described with reference to a fixed-location fastening element that is secured in a fastener-hole 202, 302, other embodiments may provide the fixed-location fastening element formed as an integral part of the panel 200, 300. For example, in various embodiments, the panels 200, 300 are manufactured from plastic and the fixed-location fastening element is molded into the panel during manufacture. This approach can reduce production costs by eliminating manufacturing and assembly steps needed where separate fixed-location fastening elements are employed in combination with the panels. According to these embodiments, the movable fastening is received in the fixed-location fastening element integral to the panel to secure a bracket to the panel 200, 300 during assembly of building structure.

Various embodiments achieve the preceding and allow panels to be attached to one another at 90 degrees at the intersection of the respective ideal plane associated with each. As a result, the embodiments described herein maintain ideal modularity even where "T-connections" are made between panels. Referring to FIG. 4A, a structure that provides the preceding is illustrated in accordance with one embodiment. The structure 400 includes a first panel 420A, a second panel 420B and a third panel 420C. Depending on the embodiment, the panels 420A, 420B, 420C can include embodiments illustrated and described with reference to the panel 200 or 300 of FIGS. 2 and 3, respectively. For clarity, fastening hardware is omitted in FIG. 4A.

According to the illustrated embodiment, the second panel 420B and the third panel 420C are attached in a single plane adjacent to one another. The first panel 420 A is attached perpendicular to the panels 420B, 420C at a location where the second panel 420B and the third panel 420C are attached. A first ideal plane A associated with the first panel 420A is illustrated along with a second ideal plane B associated with each of the second panel 420B and the third panel 420C.

Each of the panels 420A-420C includes edges (for example, the edges 403A, 403B, 403C, respectively) with the structure shown and described regarding the edges 203 and 303 illustrated and described with reference to FIGS. 2 and 3, respectively. That is, the edges include a symmetrical chamfer located on either side of a central planar region that is perpendicular to the ideal plane.

As a result of the structure provided by the panels 420A-420C, the T-intersection illustrated in FIG. 4A allows an edge of the first panel 420A to be inserted between the second panel 420B and the third panel 420C in a manner that allows the panels to be attached to one another at an intersection of the ideal planes A and B.

Figure 4B:
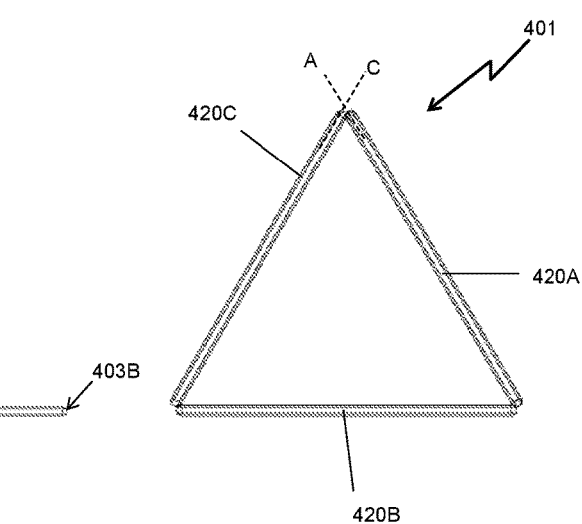
FIG. 4B illustrates a second orientation of multiple panels in accordance with one embodiment.

The embodiment illustrated and described with reference to FIG. 4 also allow the panels 420A-420C to be attached to one another at acute angles at the intersection of the respective ideal plane associated with each. Referring to FIG. 4B, a structure 401 includes the first panel 420A, the second panel 420B and the third panel 420C arranged in a polygon shape when viewed along the panel-edges. In particular, the structure 401 is illustrated in the form of an equilateral triangle with each of the first panel 420A, the second panel 420B and the third panel 420C being of equal length. According to this embodiment, each angle formed by the structure 401 is a 60 degree angle. However, according to other embodiments, the polygon has a different shape and the acute angles will vary. For example, in one embodiment, the structure is an isosceles triangle that includes two 30 degree angles and a 120 degree angle. For clarity, fastening hardware is also omitted in FIG. 4B.

According to the illustrated embodiment, the first panel 420A is attached at an acute angle to each of the second panel 420B and the third panel 420C. The second panel 420B is attached at an acute angle to each of the first panel 420A and the third panel 420C. Similarly, the third panel 420C is attached at an acute angle to each of the first panel 420A and the second panel 420B. In each instance, the panels are attached at an intersection of the ideal planes, respectively, of the panels that are being attached. For reference, a first ideal plane A associated with the first panel 420A and a second ideal plane C associated with the third panel 420C is illustrated in FIG. 4B.

As a result of the features included in the panels 420A-420C, the panels can be attached to one another at an intersection of the ideal planes even at acute angles or obtuse angles. Thus, for example, the first panel 420A and the third panel 420C are attached to one another at an intersection of the first ideal plane A and the second ideal plane C.

Figure 5A:
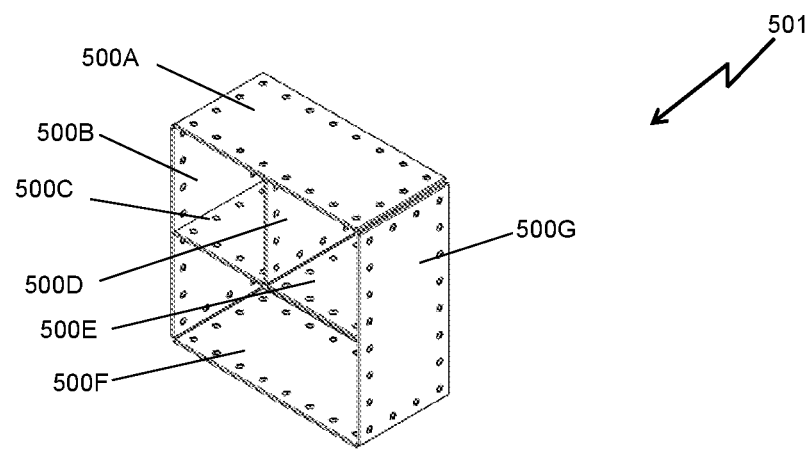
FIGS. 5A and 5B illustrate a structure assembled using a building system in accordance with one embodiment.
Figure 5B:
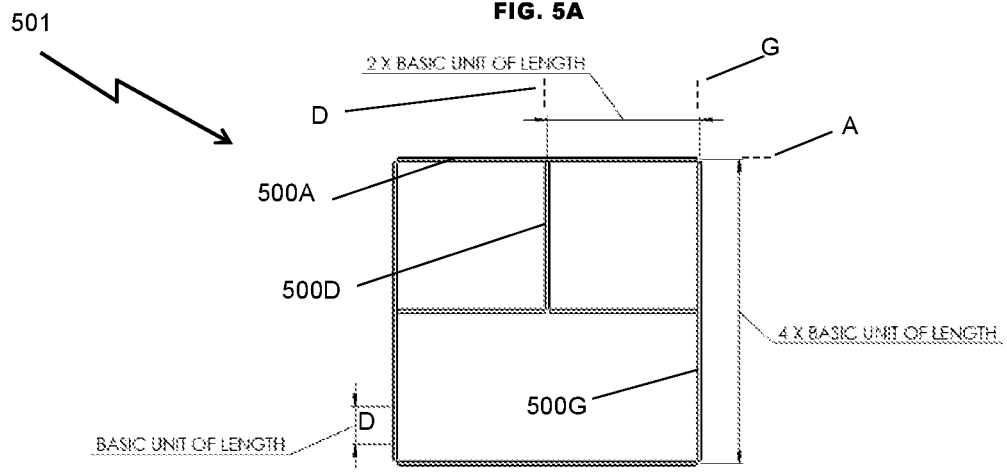

Referring now to FIGS. 5A and 5B a structure 501 is illustrated in an embodiment that includes ideal modularity. As illustrated in FIG. 5A, the structure 501 includes a plurality of panels including a top panel 500A, a first side panel 500B, a first horizontal panel 500C, a vertical divider panel 500D, a second horizontal panel 500E, a bottom panel 500F and a second side panel 500G. According to one embodiment, each panel 500A-500G of the plurality of panels include the features shown and described with reference to the panel 200 of FIGS. 2A-2C. According to another embodiment, each panel 500A-500G of the plurality of panels include the features shown and described with reference to the panel 300 of FIGS. 3A-3B. Here too, fasteners are omitted in the interest of clarity.

The structure provides a shelving structure with an overall polygon shape defined by the top panel 500A the first side panel 500B, the bottom panel 500F and the second side panel 500G. The first horizontal panel 500C and the second side panel 500E are aligned with one another in an edgewise fashion to provide a central shelf within the structure 501. The vertical divider panel 500D forms a T-intersection with both the top side of the central shelf and the underside of the top panel 500A. In contrast to the prior art structure 100 of FIG. 1, in the illustrated embodiment, the building system provides for assembly of the structure 501 with ideal modularity. The preceding remains true regardless of the number of levels that are added to the structure 501.

Referring to FIG. 5B, dimensional features of the building system are described in accordance with this embodiment. Here, a basic unit of length D is established as a distance separating adjacent fastener holes along the edge of the panels, for example, as illustrated with reference to the panel 500B. The length of each of the panels 500A-500G is established as an integer multiple of the basic unit of length. The structure 501 includes a first panel-type with a nominal length equal to two times the basic unit of length. The structure 501 also includes a second panel-type with a nominal length equal to four times the basic unit of length. In addition, the edges of the panels 500A-500G include a symmetrical chamfer. As a result of the chamfers, a small gap is provided at an intersection between panels. The gap allows the panels to be aligned and fastened together such that their ideal planes intersect. For example, the T-intersection formed by the first horizontal panel 500C, the second horizontal panel 500E and the vertical divider panel 500D allows the vertical divider panel 500D to be inserted between the respective ends of the first horizontal panel 500C and the second horizontal panel 500E and fastened together at an intersection of the respective ideal planes of each.

Figure 6:
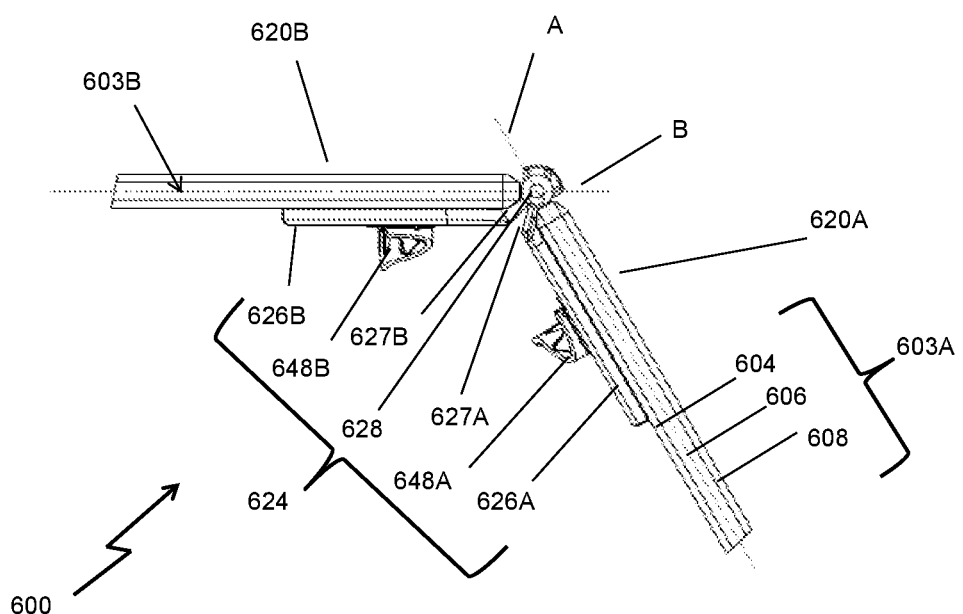
FIG. 6 illustrates a close-up view of a connection between building components in accordance with one embodiment.

Referring now to FIG. 6, a building system 600 including an attachment of building components is illustrated in accordance with one embodiment. The building system 600 includes a first panel 620A, a second panel 620B and connecting hardware 624. FIG. 6 illustrates a side view along a first edge 603A of the first panel 620A and a first edge 603B of the second panel 620B. A first ideal plane A is associated with the first panel 620A and a second ideal plane B is associated with the second panel 620B.

The connecting hardware 624 includes a first flange 626A, a second flange 626B, a first neck 627A, a second neck 627B and a hinge barrel 628. FIG. 6 also illustrates handles 648A and 648B included in the fasteners associated with the first flange 626A and the second flange 626B, respectively. The fasteners are illustrated and described in greater detail below. The connecting hardware 624 can be manufactured of plastic, metal or other material that has sufficient mechanical strength and stiffness to maintain the panels 620A, 620B in a desired angular relationship to one another and support weight as required for use in the overall modular structure in which it is employed.

The connecting hardware 624 includes the first flange 626A attached to the hinge barrel 628 by the neck 627A and the second flange 626B attached to the hinge barrel 628 by the neck 627B. The first flange 626A is attached to the first panel 620A and the second flange 626B is attached to the second panel 620B, for example, using fasteners that include the handles 648A, 648B, respectively. According to the illustrated embodiment, the necks 627A, 627B are thinner than the flanges 626A, 626B. This approach makes more space available in the region between the necks 627A, 627B as the first flange 626A and the second flange 626B along with the attached hinge barrel are rotated about the axis of the hinge through a range of motion that reduces the angle between the first panel 620A and the second panel 620B. According to some embodiments, the connecting hardware 624 is employed in large scale play furniture assembled by children. In these embodiments, the connecting hardware provides improved child safety.

According to another embodiment, the fastening hardware 624 does not include the hinge barrel 628. Instead, the fastening hardware 624 is a fixed-angle bracket with the flanges 626A, 626B attached to one another at a fixed angle at the intersection of the first ideal plane A and the second ideal plane B.

Figure 7A:
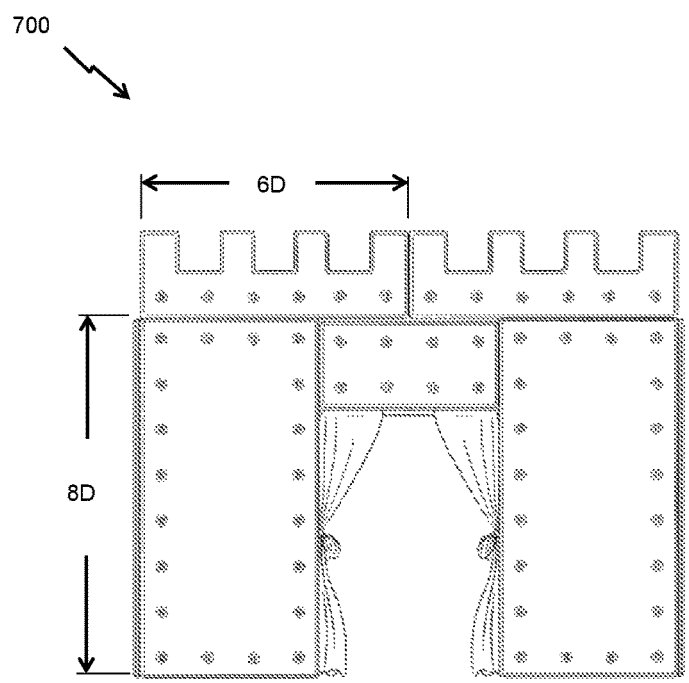
FIGS. 7A and 7B illustrate a structure assembled using a building system in accordance with one embodiment.
Figure 7B:
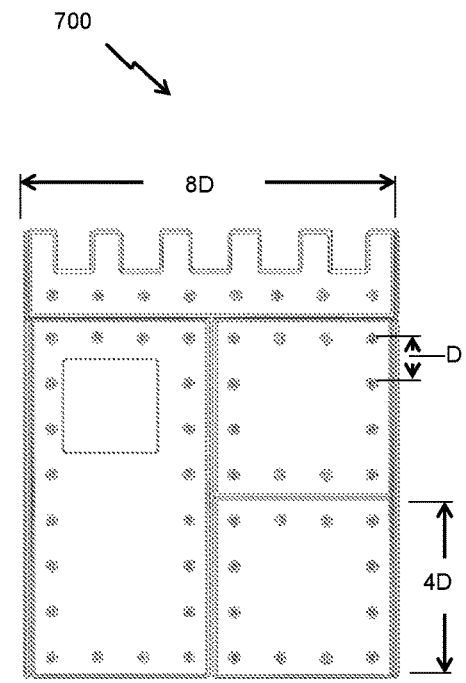

In various embodiments, the hardware shown and described with reference to FIGS. 2-6 is included in modular building sets for construction of large scale play structures by children. According to these embodiments, the structures are assembled with ideal modularity such that all panel dimensions and all fastener-hole spacing are multiples of a basic unit of length and the panels are connected in a manner that provides ideal modularity. Referring now to FIGS. 7A and 7B, a building structure 700 is illustrated in accordance with one such embodiment. According to this embodiment, the building structure 700 is a castle. However, the modular building systems described herein can include a wide variety of building components to facilitate an assembly of a large number of different building structures, including custom structures. FIG. 7A provides a front view of the building structure 700. FIG. 7B provides a side view of the building structure 700.

According to one embodiment, a basic unit of length D is established for a variety of different building components included in a building system that allows for the assembly of the building structure 700 and others. For example, the building components can include panels that have different dimensions (length and width) where all of the dimensions are an integer multiple of the basic unit of length D. For example, in FIGS. 7A-7B, a height of the vertical panel used to form the front wall of the structure 700 is eight times the basic unit of length D. As illustrated in FIG. 7B, the sides of the structure 700 include single panels that are 8D in length and 4D in width. The sides of the structure 700 also includes panels stacked on edge one above the other each panel being 4D by 4D. The structure has a depth of 8D as a result. Accordingly, the top side panels that include a decorative embattlement are 8D in length. FIG. 7A illustrates two top front panels each 6D in length and including decorative embattlements formed on their upper edge. Depending on the embodiment, accessories may not include dimensions that conform to ideal modularity. For example, the panels including decorative embattlements illustrated in FIGS. 7A and 7B each have a height that is not a multiple of the basic unit of length D. Other accessories can be modified similarly especially in other examples where they primarily serve a decorative purpose.

Figure 8A:
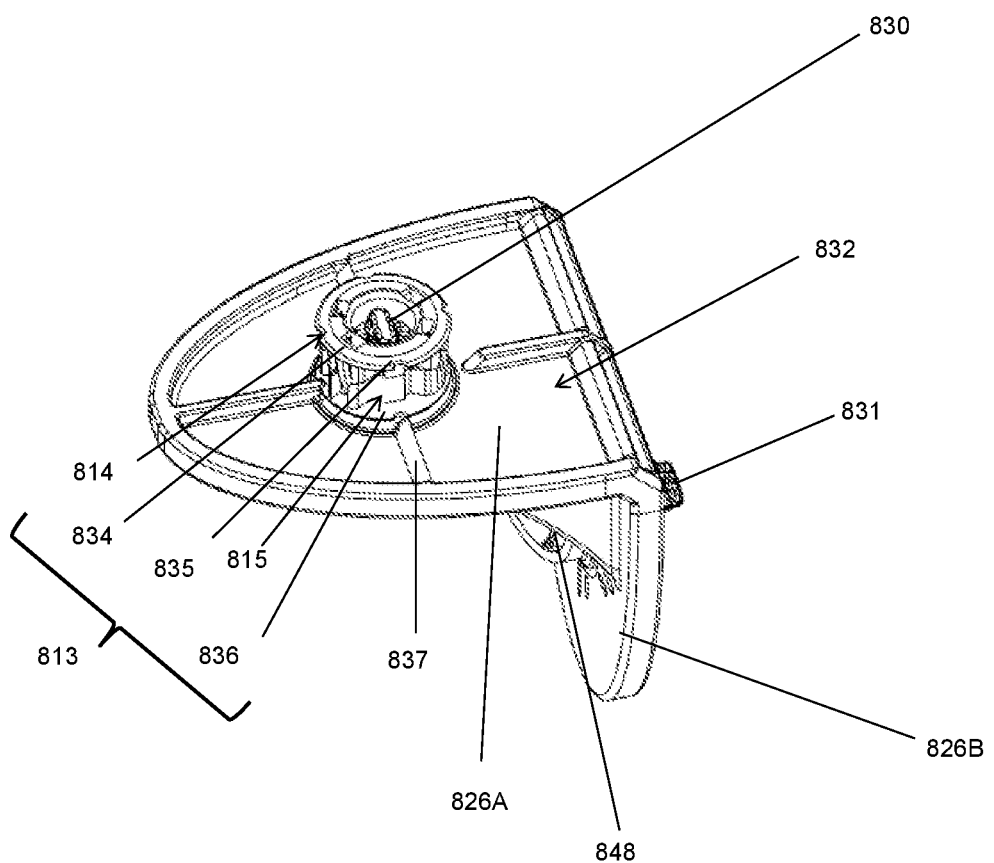
FIG. 8A illustrates an isometric view of a fastening system in accordance with one embodiment.
Figure 8B:
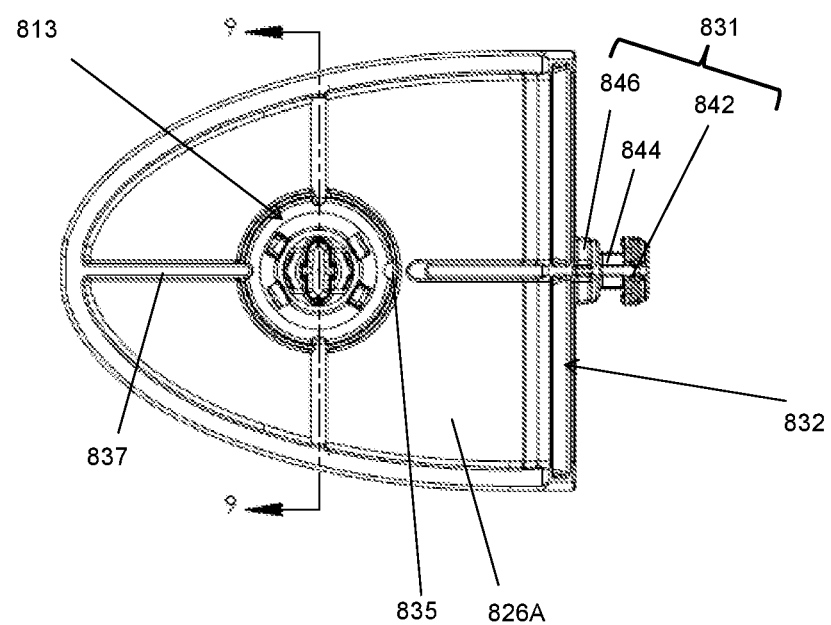
FIG. 8B illustrates a top view of the fastening system of FIG. 8A in accordance with one embodiment.

The approaches described herein can employ a variety fastening hardware and fastening holes depending on the embodiment. Referring now to FIGS. 8A and 8B, a fastening system including fastening hardware is illustrated in accordance with a first embodiment. The illustration intentionally omits the panels with which the fastening hardware is used to better illustrate the features of the fastening hardware. The fastening hardware includes a fixed-location fastening element 813 and a fastener 830. According to some embodiments, the fixed-location fastening element 813 is provided when a first insert 814 and a second insert 815 are pressed into a locking engagement with one another in a hole (for example, 202, 302, 1202) in a panel. FIGS. 8A and 8B also include a bracket 832 used to attach two adjacent panels to one another in a larger building structure. In contrast to the fixed-location fastening element 813, the fastener 830 is a movable fastener because it is associated with the bracket 832 which can be used in any of a variety of building structures. That is, the fastener 830 and bracket 832 can be employed to assemble a series of building structures that are built and disassembled after a period of use. For example, the bracket 832 can be used with a first pair of panels in the assembly of a first large-scale play structure. The bracket 832 can be disconnected from the first pair of panels when the user decides to disassemble the first large-scale play structure and assemble a second large-scale play structure that is completely different. Here, the fastener 830 and bracket 832 may be used with the same pair of panels or two different panels. According to one embodiment, the fastener 830 is secured to the bracket 832. Further, FIG. 8A illustrates the fastener 830 as a first fastener associated with the bracket 832 and also a second fastener 831 associated with the bracket 832. The bracket includes a first flange 826A and a second flange 826B.

According to the illustrated embodiment, the fixed-location fastening element 813 includes a first annular flange 834 and a second annular flange 836. The annular flanges 834, 836 each include a plurality of cutouts 835 spaced around the radially outer edge of the flanges 834, 836, respectively. According to the illustrated embodiment, the first flange 834 is included in the first insert 814 and the second annular flange 836 is included in the second insert 815. The fasteners 830, 831 include handles respectively that allow a user to easily grip the fastener and rotate it between the unlocked and unlocked position. FIG. 8A illustrates a portion of a handle 848 of the second fastener 831. The bracket 832 includes a plurality of ribs 837 located on the surface of the flange that is placed in contact with a building panel when the bracket is secured to the panel. According to the illustrated embodiment, the plurality of cutouts 835 are formed to receive a proximate end of a rib 837. In the illustrated embodiment, the ribs are provided in varying lengths such that a single rib of the plurality of ribs is engaged with the fixed-location fastening element 813 when the fastener 830 is secured to the fixed-location fastening element 813. That is, a proximate end of the leftmost rib 837 in FIG. 8A is secured within a corresponding cutout 835. In operation, the engagement of the two components secures the bracket in a fixed rotational position relative to the fixed-location fastening element 813. Because the fixed-location fastening element 813 is secured in a fixed rotational position in the panel, this feature results in the flange 826A being in a fixed rotational position relative to the panel. According to further embodiments, multiple ribs included in the plurality of ribs 837 engage corresponding cutouts 835.

In operation, the fixed-location fastening element 813 is secured within a fastener hole included in a panel, for example, as illustrated with reference to the panel 1200 and the plurality of holes 1202 illustrated in FIG. 12. The design of the fastening system is such that the fixed-location fastening element 813 remains in a fixed rotational position within the panel. To secure the bracket to a panel, a distal end of the fastener 830 is inserted within the fixed-location fastening element 813 and the fastener 830 is rotated to a locked position to secure the fastener and associated bracket 832 to the fixed-location fastening element 813. Referring to FIG. 8B further details of the fastener 831 are illustrated. The fastener 831 includes a locking member 842, a central post 844 and a stop 846 that are provided in an integral fastener that also includes the handle 848.

Figure 9:
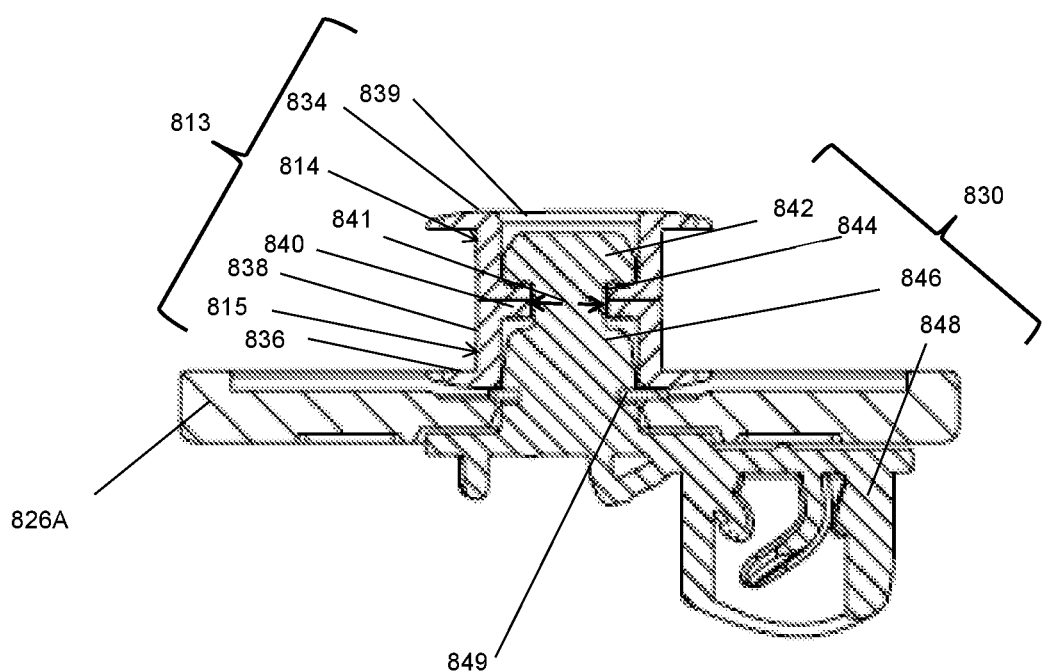
FIG. 9 illustrates a cross-sectional view of the fastening system of FIGS. 8A and 8B in accordance with one embodiment.

FIG. 9 illustrates a cross-sectional view of the fixed-location fastening element 813, the fastener 830 and the bracket 832 of FIG. 8. According to the illustrated embodiment, the fixed-location fastening element 813 includes the first annular flange 834, the second annular flange 836, the central region 838, a hollow region 839 and a pair of extensions 840. The fastener 830 includes the locking member 842, the central post 844, the stop 846 and the handle 848. In general, the fastener 830 is oriented in a first rotational position, inserted to a predetermined depth within the fixed-location fastening element 813 and rotated to engage the fastener 830 with the fixed-location fastening element 813 to secure the fastener to the fixed-location fastening element 813. In FIG. 9, the fastener 830 is shown in the fastened position in which it is securely attached to the fixed-location fastening element 813. The result of the preceding operation is to secure the first flange 826A associated with the bracket 832 to the panel in which the fixed-location fastening element 813 is installed.

The first annular flange 834 is located at a first end of the fixed-location fastening element 813 and the second annular flange 836 is located at a second end opposite the first. The central region 838 connects the two flanges 834, 836 to one another. According to the illustrated embodiment, the central region 838 has a smaller diameter than the two flanges 834, 836. The hollow region 839 has an overall cylindrical shape and extends from the first end of the fixed-location fastening element 813 to the second end of the fixed-location fastening element 813. That is, a portion of the hollow region 839 is located within each of the first annular flange 834, the second annular flange 836 and the central region 838. The pair of extensions 840 extend radially inward into the hollow region 839 from a cylindrically-shaped interior wall that defines the hollow region 839. According to the illustrated embodiment, the pair of extensions 840 is not annular. Instead, a first of the pair extends for a limited amount of the circumference of the hollow region 839, for example, for 45 degrees or less. A second of the pair extends opposite the first of the pair of extensions. Further, the pair of extensions 840 defines a narrowed region 841 within the hollow region 839. As described in greater detail below, the pair of extensions 840 aid in securing the fastener 830 to the fixed-location fastening element 813 when the fastener 830 is inserted within the fixed-location fastening element 813 and rotated to a secured (or "locked") position.

As illustrated in FIG. 9, some features provided in the first insert 814 and the second insert 815, respectively, are combined with the two inserts coupled to one another to provide the overall internal structure of the fixed-location fastening element 813. That is, each of the central region 838, the hollow region 839 and the pair of extensions are provided as a result of the combined features of the two inserts 814, 815. For example, the hollow region 839 extends from an opening defined by the first annular flange 834 to an opening defined by the second annular flange 836 via a cylindrical hollow region located within the first insert 814 and a cylindrical hollow region located within the second insert 815. Similarly, the overall structure of the pair of extensions 840 is provided by the combination of a first pair of extensions included in the first insert 814 and a second pair of extensions included in the second insert 815.

The central post 844 and the locking member 842 define a general t-post shape that is included at the distal end of the fastener 830. The handle 848 is located at a first (or proximate end) of the fastener 830. The central post 844 connects the locking member 842 to the stop 846 which is located approximately midway between the handle 848 and the locking member 842. According to the illustrated embodiment, the locking member 842 is defined by two walls substantially parallel to one another that provide the locking member 842 with a generally rectangular shape that has a length that is greater than the diameter of the central post 844. The stop 846 is provided as an annular extension for 360 degrees about the longitudinal axis of the fastener 830. The stop 846 has a diameter that is greater than diameter of the central post 844. According to one embodiment, the length of the locking member 842 and the diameter of the stop 846 are substantially equal. According to a further embodiment, the length of the locking member 842 and the diameter of the stop 846 are sized to be slightly smaller than the diameter of the hollow region 839.

As described in more detail with reference to FIG. 11, the fixed-location fastening element 813 is fully received within a fastener hole, for example, in a panel 200, 300, 1200. According to one embodiment, an outer surface of the first annular flange 834 is flush with a first side of the panel and an outer surface of the second annular flange 836 is flush with a second side of the panel. According to an alternate embodiment, the outer surface of the first annular flange 834 is raised above the first side of the panel and the outer surface of the second annular flange 836 is raised above the second side of the panel with the fixed-location fastening element 813 fully received within a fastener hole of a panel. According to the latter embodiment, the fastener holes in which the fixed-location fastening element 813 is received do not include any countersinking because it is unnecessary where the flanges 834, 836 are not recessed within the panel, for example, as described in greater detail below.

In any of these embodiments, the fixed-location fastening element 813 is secured in a fixed rotational position when fully received within the fastener hole. The user grasps the handle 848 and then inserts a distal end of the fastener 830 into the fixed-location fastening element 813 while moving the attached bracket 832 into engagement with a surface of the panel, and in some embodiments, a surface of the insert. Still grasping the handle 848 the user rotates the fastener 830 to rotate the locking member 842 so that it is perpendicular to the position of the narrow region 841 between the pair of extensions 840. The fastener 830 is inserted in the fixed-location fastening element 813 until the distal face of the stop 846 contacts the pair of extensions 840. The fastener 830 is now fully inserted in the fixed-location fastening element 813. The user rotates the fastener 830 90 degrees to place the fastener 830 in the secured position illustrated in FIG. 9. In the secured position, the rotational position of the fastener 830 aligns the locking member 842 with the pair of extensions 840. The result of this operation is that the fastener 830 is now secured within the fixed-location fastening element 813 and the bracket 832 is secured to the panel in which the fixed-location fastening element 813 is installed. The user can later disassemble the connection by either reversing the original direction of rotation to return the fastener 830 to the original unsecured position or continuing the original direction of rotation another 90 degrees. Each of the preceding acts to release the fastener 830 from engagement with the fixed-location fastening element 813.

In various embodiments, the bracket 832 and the fastener 830 are attached to one another such that they cannot be easily separated by users, for example, attached to one another prior to the building system being shipped to the consumer. According to these embodiments, the fastener 830 remains free to rotate between the secured and the unsecured position while remaining attached to the bracket 832. According to the illustrated embodiment, the assembly includes a retaining ring (or "C-clip") 849 that secures the fastener 830 to the bracket 832. For example, the retaining ring 849 can be slid around the shaft of the fastener 830 once it is inserted within a hole in the bracket 832. Once the fastener 830 is placed in secure engagement with the bracket 832, the axial motion of the fastener 830 relative to the bracket 832 is constrained by the attachment with the retaining ring 849.

Figure 10:
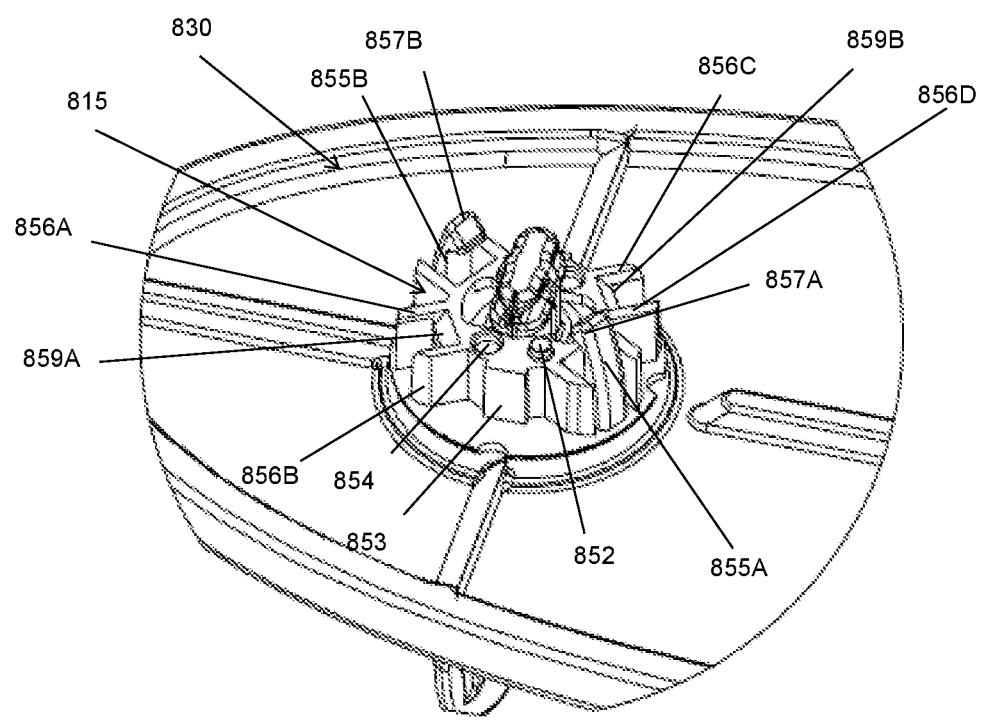
FIG. 10 illustrates close-up view of the fastening system of FIGS. 8A and 8B with a portion of one component removed in accordance with one embodiment.

According to some embodiments, the fixed-location fastening element 813 is a two piece unit with the first insert 814 inserted in a fastener-hole from a first side of a panel and the second insert 815 inserted in the same fastener-hole via a second side of the panel. As illustrated in FIG. 10, the second insert 815 includes at least one projection 852, a planar surface 853, at least one receiving opening 854 and at least one rib 856. In further embodiments, the second insert 815 includes a plurality of projections 852, a plurality of planar surfaces 853, a plurality of openings 854 and a plurality of ribs 856. The insert also includes a first arm 855A and a second arm 855B. The arms 855A, 855B each include a hook 857A, 857B located at a distal end of the arms 855A, 855B, respectively. According to these embodiments, the first insert 814 includes similar structure.

According to the illustrated embodiment, a pair of ribs 856A, 856B included in the second insert 815 define a slot configured to receive a hook 857A, 857B, respectively, included in the first insert 814. A ledge 859A is located in the slot or region between the pair of ribs 856A, 856B. A second ledge 859B is also visible between a second pair of ribs 856C, 856D in FIG. 10. According to the illustrated embodiment, each ledge includes a ramp-like surface.

A complete fixed-location fastening element 813 is assembled by pushing the second insert 815 into engagement with the first insert 814 in an axial direction with the projections 852 of the first insert 814 aligned with the corresponding openings 854 included in the second insert 815 and vice versa. That is, the rotational position of the two inserts must be established such that the projections 852 and the openings 854 included in the second insert 815 align with corresponding elements included in first insert 814. That is, the projections 852 included in the second insert 815 align with openings included in the first insert 814. Similarly, the openings 854 included in the second insert 815 align with projections included in the first insert 814.

According to some embodiments, the arms 855A, 855B are resilient, that is, they are capable of flexing in a radial outward direction and later returning to their normal static position. With the proper rotational alignment of the two insert as described above, the arms 855A, 855B are aligned with corresponding slots in the first insert 814. When the two inserts are pressed together, the distal end of the arms 855A, 855B are deflected in a radial outward direction as the hook 857A, 857B engages the corresponding ledge 859 included in the first insert 814. However, with the two inserts fully-pressed together, the distal end of the two arms 855A, 855B move beyond the ledges such that the radially outward force on hooks 857A, 857B is removed. That is, the pressing-engagement between the ramp of the ledge and the hook is relieved. At this stage, the resilient arms deflect radially inward in the direction of their static state such that the hooks 857A, 857B are captured on the underside of the corresponding ledge 859A, 859B.

According to some embodiments, adhesive is applied to either or both of two halves when they are inserted into the fastener opening. For example, adhesive can be applied to either or both of the faces on each half where the projections are located and to the radially outer surfaces of the two halves. The plurality of ribs 856 also provide a friction fit of the fixed-location fastening element 813 within the fastener opening. For example, where the fixed-location fastening element 813 is manufactured from a material that is harder than the material of manufacture of the panel, the ribs can deform grooves into the inside walls of the fastener holes. According to one such embodiment, the fixed-location fastening element 813 is manufactured from plastic such as polypropylene, ABS or nylon and the panel is manufactured from wood.

According to some embodiments, the plurality of holes 202, 302, 1202 included in the panel have a generally rectangular shape, for example, including rounded corners. The preceding is described in greater detail below with reference to FIG. 12. According to these embodiments, the fixed-location fastening element 813 has an overall shape that closely corresponds to the non-circular shape of the hole. The preceding combination of features can be employed to maintain the fixed-location fastening element 813 in a fixed rotational position when secured in the hole. According to these embodiments, the planar surface 853 is located on opposing sides of each insert 814, 815. These "flats" provide a surface that is configured to engage the long-side of the generally rectangular-shaped hole and assist in properly orienting the insert in the hole.

Figure 11:
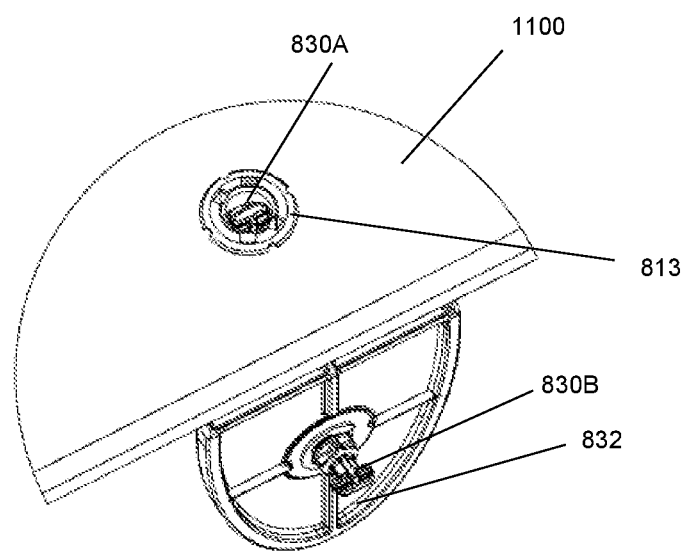
FIG. 11 illustrates an isometric view of the fastening system of FIGS. 8A and 8B employed with a panel in accordance with one embodiment.

Referring now to FIG. 11, a combination of the fixed-location fastening element 813, the fastener 830 and the bracket 832 are illustrated in use with a panel 1100. The panel 1100 includes a plurality of fastener-holes (not illustrated). In the illustrated embodiment, the bracket 832 includes two flanges separated by one another by 90 degrees. When attached to adjacent panels, the bracket 832 secures the panels at right angles to one another. The bracket 832 is secured using two fasteners 830A and 830B. Each fastener is as illustrated and described with reference to FIG. 9. For example, the fasteners 830A, 830B each include a locking member, a central post and a stop.

In some embodiments, the length of the central post 844 is established, at least in part, to prevent the distal end of the fastener 830 from extending beyond the exterior surface of the flange. The outside diameter of the central region 838 is established to provide an interference fit within the hole. For example, in one embodiment, the overall shape of the inserts 814, 815 can include a taper with an increasing outside diameter when moving outward from a midpoint of the fixed-location fastening element 813 in an axial direction toward one of the respective annular flanges 834, 836. In the illustrated embodiment, the exterior surfaces of the annular flanges 834, 836 are raised above the surface of the panel and the distal end fastener 830 is flush (or in some embodiments, slightly recessed) relative to the exterior surface of the flange and/or the panel.

Figure 12:
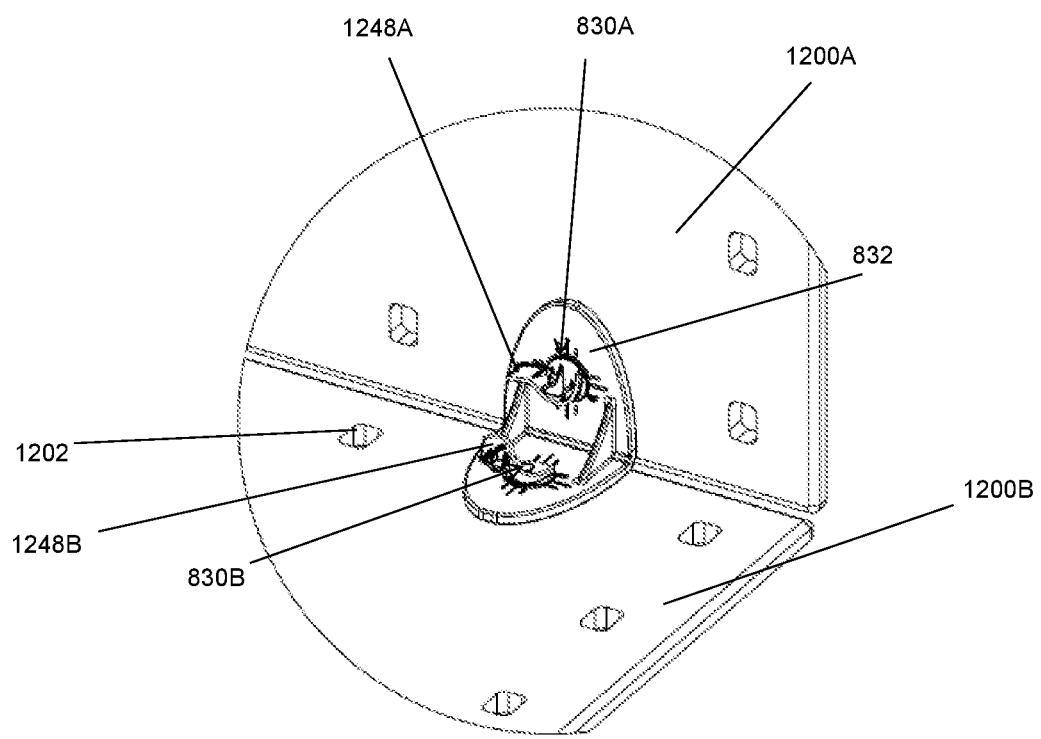
FIG. 12 illustrates a view of a fastening system employed to attach two panels in accordance with one embodiment.

Referring now to FIG. 12, a first panel 1200A and a second panel 1200B are attached to one another at right angles using the bracket 832, the first fastener 830A and the second fastener 830B. The attachment positions panels 1200A, 1200B at an intersection of the ideal plane of the first panel 1200A and the ideal plane of the second panel 1200B. According to the illustrated embodiment, each fastener 830A, 830B includes a handle 1248A, 1248B, respectively. The handles 1248 includes an extension (or "tail") that extends radially in one direction from the longitudinal axis of the fastener 830. The extension increases the user's leverage when moving the fastener 830 between the released position and the secured position.

FIG. 12 also illustrates an embodiment that employs a plurality of fastener holes 1202. According to the illustrated embodiment, the plurality of holes 1202 are each sized to receive a respective fastening element in the form of an insert. According to this embodiment, each of the plurality of holes 1202 has an overall non-cylindrical shape. In particular, each of the fastener holes 1202 has an overall rectangular shape with a radius at each corner. This shape can, for example, be employed with the fixed-location fastening element 813 illustrated and described with reference to FIGS. 8-10. The fixed-location fastening element 813 can also be secured by one or a combination of a friction fit and adhesive within one of the holes 1202. As is described in detail herein, the fixed-location fastening element 813 can be provided as a single component or two components that are secured together to form a fixed (or stationary) fastening element.

Figures 13A, 13B:
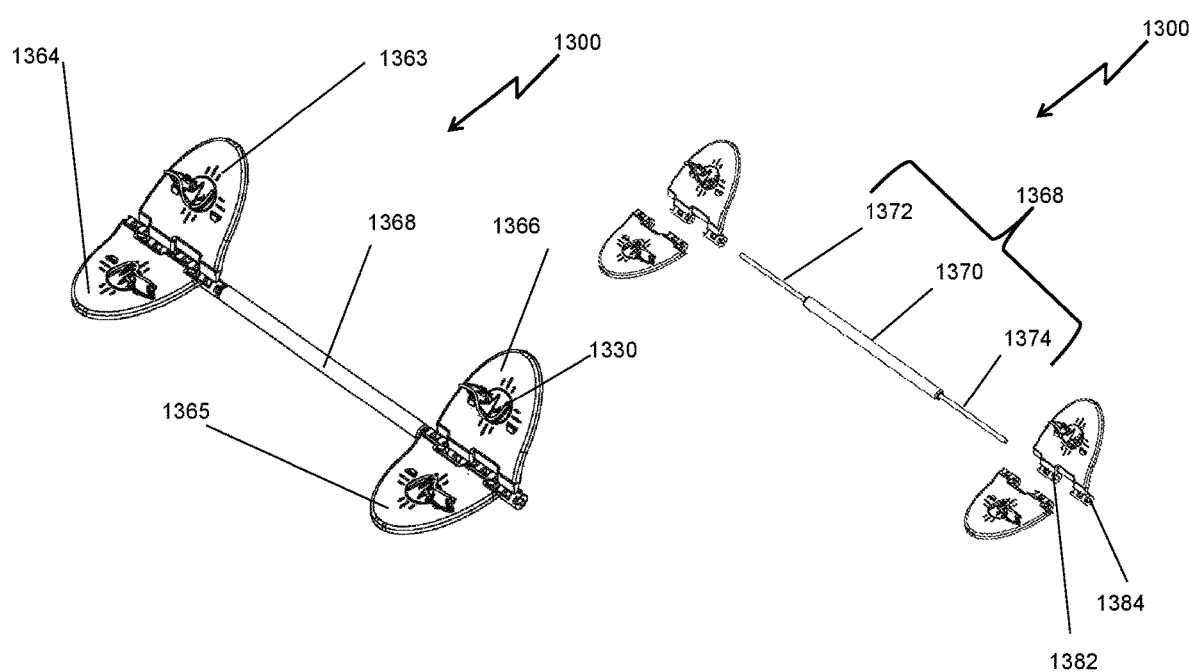
FIGS. 13A and 13B illustrate a hinge in accordance with one embodiment.

Referring now to FIGS. 13A and 13B, a hinge 1300 is illustrated in accordance with one embodiment. According to the illustrated embodiment, the hinge 1300 includes multiple components including a first flanged connector element 1363, a second flanged connector element 1364, a third flanged connector element 1365, a fourth flanged connector element 1366 and a hinge pin 1368. The hinge pin 1368 includes a central region 1370, a first end region 1372 and a second end region 1374. The flanged connector elements 1363, 1364, 1365, 1366 each include the flange with a fastener 1330 coupled to the flange, respectively, for example, with a C-clip. Each flanged connector element also includes a first hollow cylinder 1382 and a second hollow cylinder 1384, for example, as identified in FIG. 13B in association with the fourth flanged connector element 1366.

FIG. 13B provides an exploded view of the hinge 1300. According to one embodiment, the central region 1370 is included in a single piece of material that defines the hinge pin 1368 but with a diameter that is greater than the diameter of the respective first end 1372 and second end 1374. According to another embodiment, the central region 1370 is a hollow tube that is secured in an axial location on a fixed diameter pin that includes the first end 1372 and the second end 1374. The first end 1372 and second end 1374 have diameters that are sized to allow them to be inserted within the respective hollow cylinders 1382, 1384 that they engage with to assemble the hinge. The hinge 1300 is assembled by moving the first flanged connector element 1363 and the second flanged connector element 1364 into engagement such that the respective hollow cylinders associated with each are aligned to form a single cylinder. The first end 1372 is inserted within the cylinder. The third flanged connector element 1365 and the fourth flanged connector element 1366 are moved into engagement with one another in a similar fashion to form another cylinder. The second end 1374 is inserted in the cylinder formed by the third flanged connector element 1365 and the fourth flanged connector element 1366.

In some embodiments, the hinge 1300 includes multiple features that improve the safety of the building structures in which it is included. A toy chest and other structures include a hinge having a hinge pin located in a horizontal axis. The lid is raised upwards to open the toy chest and lowered to close the toy chest. According to various embodiments, the hinge 1300 can include structures that prevent a panel from free falling as a result of gravity. In one embodiment, the hinge 1300 includes a plate with a series of serrations, that is, a pattern of alternating raised and lowered features included in an otherwise flat surface. In this embodiment, a corresponding arm includes a projection or protrusion included in the face that engages the plate. The contact between the serrations and the protrusions creates friction when the panels are moved relative to one another. In one embodiment, a single protrusion located on the arm fits into a series of recessions included in the panel to support the panel in various open positions in the manner of a nonlocking detent. Another embodiment includes a ball bearing mounted on one hinge half which presses against a plate on the second hinge half and fits with sufficient force such that gravity alone cannot cause the panel to fall.

In addition, the length and the diameter of the central region 1370 also increases the safety of structures that include the hinge 1300. In general, operation of a hinge to swing the panels further apart results in a pinch point being created along the hinge line as the hinge line opening decreases in size. However, in the illustrated embodiment, the central region 1370 spans the distance that separates the two hinge assemblies. In addition, the diameter of the central region 1370 is large enough to fill the hinge line such that the pinching hazard is eliminated.

Figure 14:
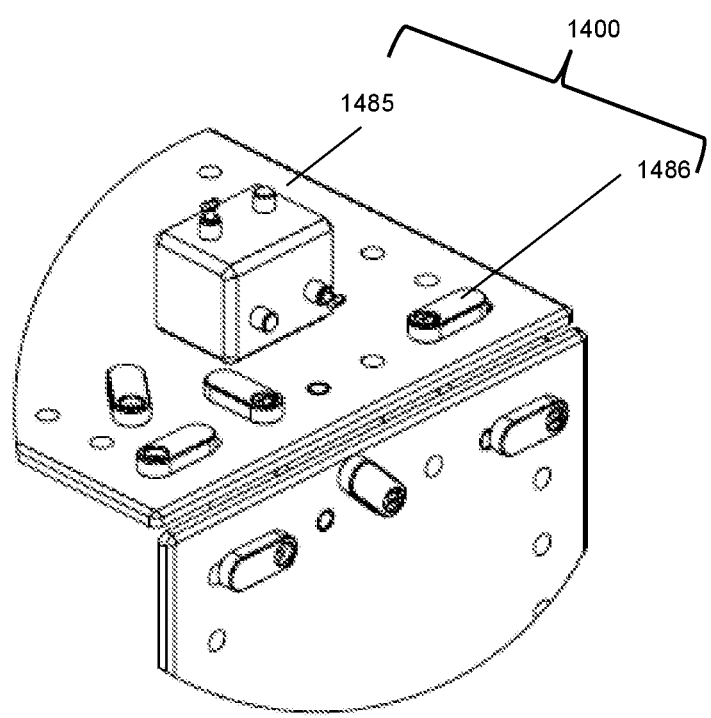
FIG. 14 illustrates a fastening system in accordance with one embodiment.

Referring now to FIG. 14, a fastener system 1400 is illustrated in accordance with a second embodiment. The fastening system 1400 includes a first element 1485 and a second element 1486 that are located on opposite sides of a panel and secured to one another via a rotational movement of the second element 1486 relative to the first element 1485. According to these embodiments, the panels include fastener-holes that are through-holes. The first element 1485 includes a body with an overall rectangular shape and a cylindrical projection and a corresponding t-post projection located on each of two sides, respectively, that are adjacent to one another. In the illustrated embodiment, the fastener system 1400 is configured to attach two panels connected at right angles to one another at an intersection of the respective ideal plane of the two panels. Accordingly, each edge of the body of the first element 1485 includes a chamfer.

The second element 1486 includes an overall planar shape with a through hole located at one end. The through hole includes structure to receive the t-post of the first element 1485 when oriented in a first position. The second element 1486 is then rotated 90 degrees to secure the t-post in the opening, and a result, secure the first element 1485 and the second element 1486 to one another on opposite sides of a panel. To attach two panels together at 90 degrees, the other t-post included in the first element 1485 is inserted through a fastener hole of the adjacent panel and secured thereto using another second element 1486.

Figure 15:
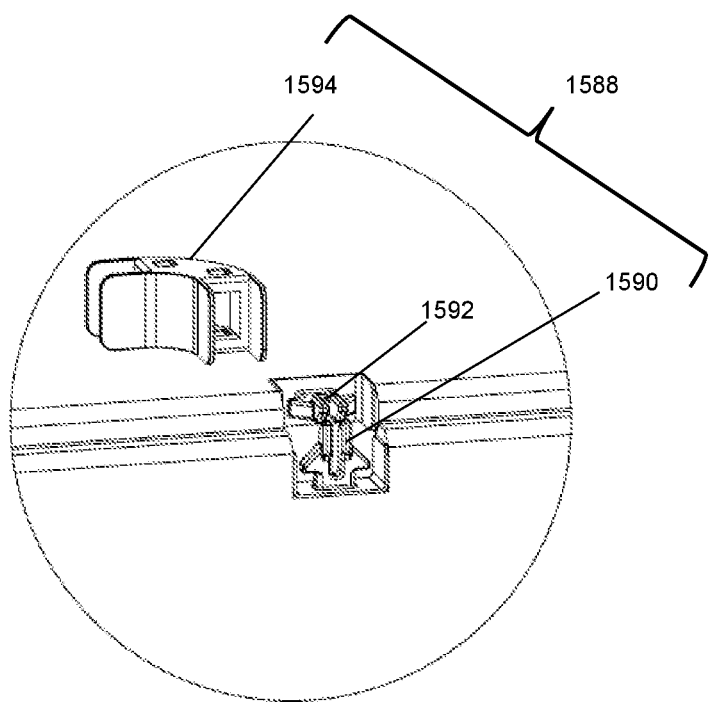
FIG. 15 illustrates a fastening system in accordance with another embodiment.

Referring now to FIG. 15, a fastener system 1588 is illustrated according to a third embodiment. The fastening system 1588 includes a first element 1590, a second element 1592 and a third element 1594. According to this embodiment, the fastener-hole is replaced with a fastener-notch integral with the panel-edge. In the illustrated embodiment, the fastening system 1588 is employed with panels that have edges that include symmetrical chamfers located on either side of a central planar region. The fastener notches are located along each edge spaced at a fixed interval equal to the basic unit of length or multiple thereof. In general, the fastener system 1588 employs an externally applied fastener that engages a corresponding element located in a notch in each of the panels, respectively.

The first element 1590 and the second element 1592 are identical components. Each includes a U-shaped base flange that is formed to be received within a notch cut into a panel edge. Projections extend outward from the base flange within the region defined by the U-shaped flange. In the illustrated embodiment, the third fastening element 1594 has a central region that sweeps in a 90 degree bend, a first opening located at a first end and a second opening located at a second end. Structure suitable for interlocking engagement with the projections included in the elements 1590, 1592 are located in each of the openings. In use, the two panels are placed at a 90 degree angle with the first element 1590 and the second element 1592 already located in the notches of the respective panels. The third fastening element 1594 is located to align the first opening with the first fastening element 1590 and the second opening with the second fastening element 1592. The third fastening element 1594 is then pressed into engagement with the fastening elements 1590, 1592 to secure the panels to one another. In the illustrated embodiment, the fastener system 1588 is configured to attach two panels at 90 degrees to one another at an intersection of the respective ideal plane of the two panels. Other connection angles can be achieved while maintaining an attachment at the ideal planes by providing the third element 1594 with a different angle between the two ends.

Figure 16A:
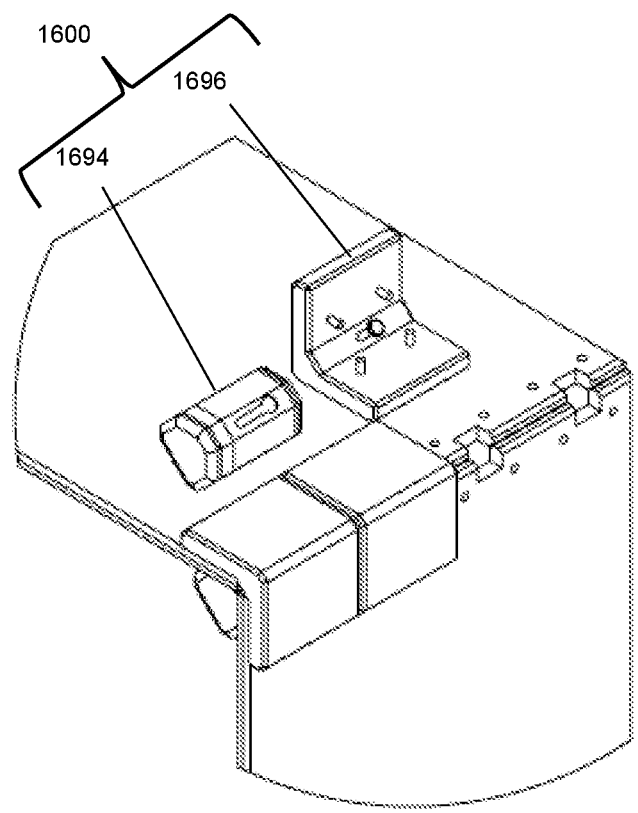
FIGS. 16A and 16B illustrate a fastening system in accordance with yet another embodiment.
Figure 16B:
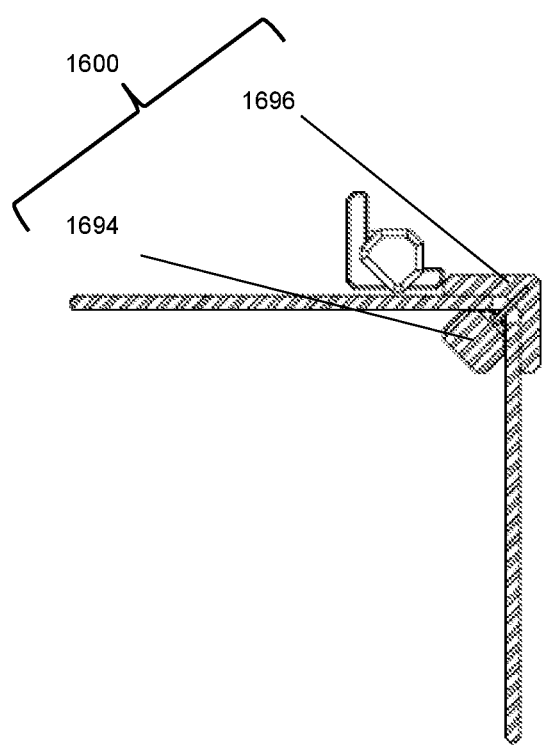

Referring now to FIGS. 16A-16B, a fastening system 1600 is illustrated according to a fourth embodiment. The fastening system 1600 is employed with panels that have edges that include symmetrical chamfers located on either side of a central planar region. The fastening system 1600 includes a first element 1694 and a second element 1696. Fastener notches are located along each panel-edge spaced at a fixed interval equal to the basic unit of length or multiple thereof. In general, the fastener system 1600 employs an externally applied fastener that includes a keyhole, the first element 1694, with an externally applied fastener that includes a pin, the second element 1696, located on the opposite side of the panel. A sliding motion is employed to interlock the two elements once engaged. In the illustrated embodiment, the fastener system 1600 is configured to attach two panels connected at right angles to one another at an intersection of the ideal plane of each of the respective panels.

The first element 1694 includes a body that includes three sides oriented in the manner of a parallelogram but having chamfered corners where the edges meet. The remaining sides locate a symmetrical chamfer about a central planar region that includes the keyhole. At least a portion of the interior of the first element 1694 is hollow. The second element 1686 includes two flanges located at right angles to one another. The interior face of each flange includes four alignment pins. A central planar region that connects the two interior faces at angle includes a pin with a head sized and configured to insert within the keyhole while being secured therein when the first element 1694 is moved relative to the second element 1696.

In operation, second element 1696 is pressed into engagement with two panels located at right angles. This is accomplished by locating the second element 1696 such that the alignment pins are aligned with corresponding holes included in the panel. In this position, the pin extending from the central planar region protrudes through the notch. Engagement of the alignment pins acts to maintain the second element 1696 in a fixed position relative to the first element 1694 as the first element is moved to secure the pin in the keyhole. FIG. 16B illustrates a cross-sectional view in a plane perpendicular to a first element 1694 and a second element 1696 that secure two panels to one another at their ideal plane.

Figure 17A:
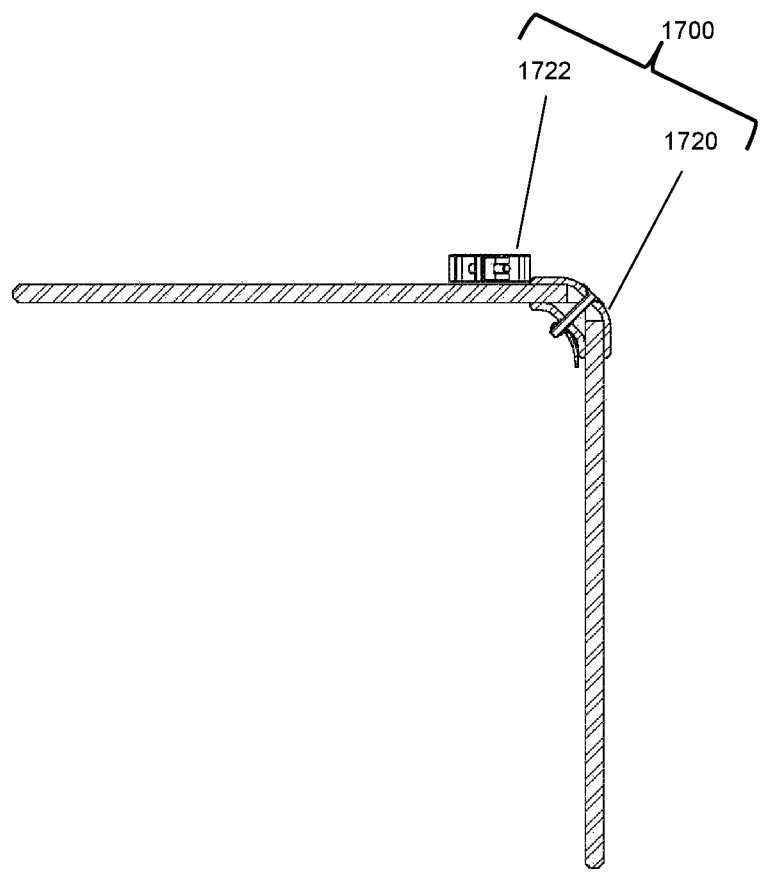
FIGS. 17A and 17B illustrate a fastening system in accordance with still another embodiment.
Figure 17B:
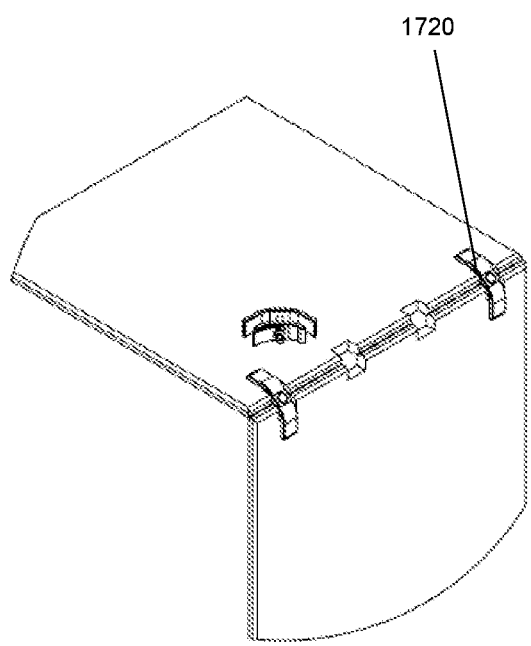

Referring now to FIGS. 17A-17B, a fastening system 1700 is illustrated according to a fifth embodiment. The fastening system 1700 is employed with panels that have edges that include symmetrical chamfers located on either side of a central planar region. The fastening system 1700 includes a first element 1720 and a second element 1722. Fastener notches are located along each panel-edge spaced at a fixed interval equal to the basic unit of length or multiple thereof. In the illustrated embodiment, the fastener system 1700 is configured to attach two panels connected at right angles to one another at an intersection of the ideal plane of each of the respective panels.

The first element 1720 includes a first winged flange that sweeps in a ninety degree bend. A pin is fixed in a central location on the flange extending perpendicularly from the flange. A lever operated clamp is located at the distal end of the pin. In a released position, the clamp extends in a direction substantially parallel to the pin. In a secured position, the clamp extends substantially perpendicular to the pin. The second element 1722 is a second winged flange that is similar in shape but smaller than the first winged flanged. A central region of the second element 1722 includes a hole that allows the second element 1722 to slide along the shaft.

In operation, the first element 1720 is inserted in a notch formed by two adjacent panels. As a result, the pin extends through the notch to the far side of the panels. The first winged flange is engaged with the surface of the two panels. The second winged flange included in the second element 1722 is engaged with the opposite surface of the two panels with the panels oriented at right angles to one another. The lever is moved from the released state to the secured state. The preceding operation presses the second winged flange into engagement with the surface of the two panels. The remainder of the lever motion draws the first winged flange and the second winged flange toward each other from opposite sides of the panel. The panels are securely pressed between the flanges when the lever reaches a fully secured position.

Figure 18:
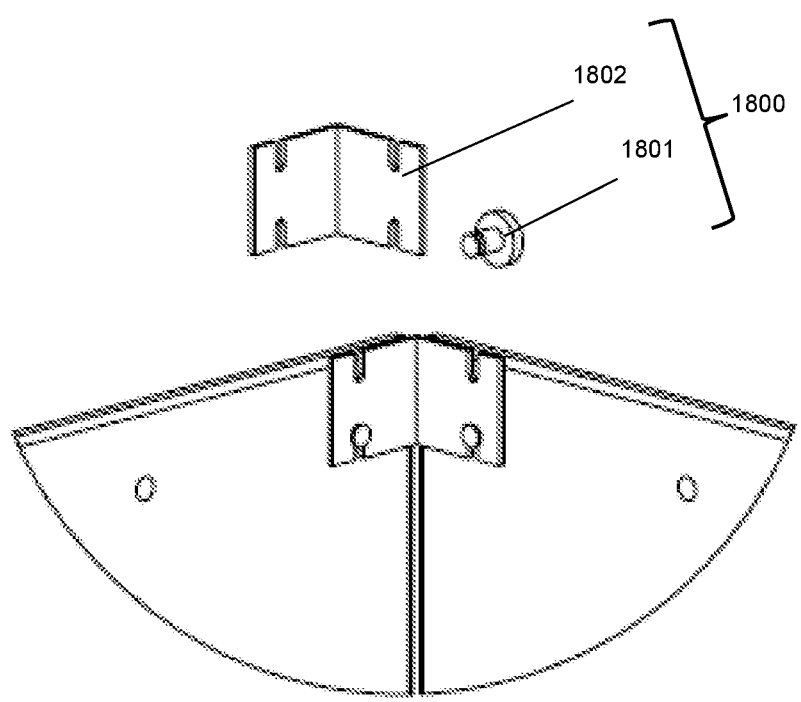
FIG. 18 illustrates a fastening system in accordance with a further embodiment.

Referring now to FIG. 18, a fastening system 1800 is illustrated according to a sixth embodiment. The fastening system 1800 includes a first element 1801 and a second element 1803. Fastener notches are located along each panel-edge spaced at a fixed interval equal to the basic unit of length or multiple thereof. In the illustrated embodiment, the fastener system 1800 is configured to attach two panels connected at right angles to one another at an intersection of the ideal plane of each of the respective panels. In various embodiments, different brackets can be provided to secure adjacent panels at right angles, in a planar configuration or a hinged configuration.

The first element 1801 includes a pin including a head, a shaft and a groove located in the shaft. The head has an outside diameter that is greater than diameter of the fastener holes located in the panel. The second element 1803 is a bracket with two flanges including slots. The width of the slots is sized to correspond to the reduced diameter of the pin in the region of the groove. The groove in the pins is sized to receive the bracket. In the illustrated embodiment, the first element 1801 and the second element 1803 are separate from the panels. In the illustrated embodiment, the fastening system 1800 is configured to attach two panels connected at right angles to one another. According to this embodiment, the brackets include two flat surfaces oriented at right angles to one another. That is, the brackets are corner brackets. According to one embodiment, the panels can be connected at an intersection of the ideal plane of each of the respective panels.

The connections between the bracket and the panels are completed by inserting a respective first element 1801 in a fastener hole in the panels to be attached. The slots in the second element are aligned above the distal end of the pin. The second element is slid along a face of the panels to capture the bracket at the slot within the respective pins. The connection can be disassembled by proceeding in the reverse order to release the pins from the keyholes.

Figure 19:
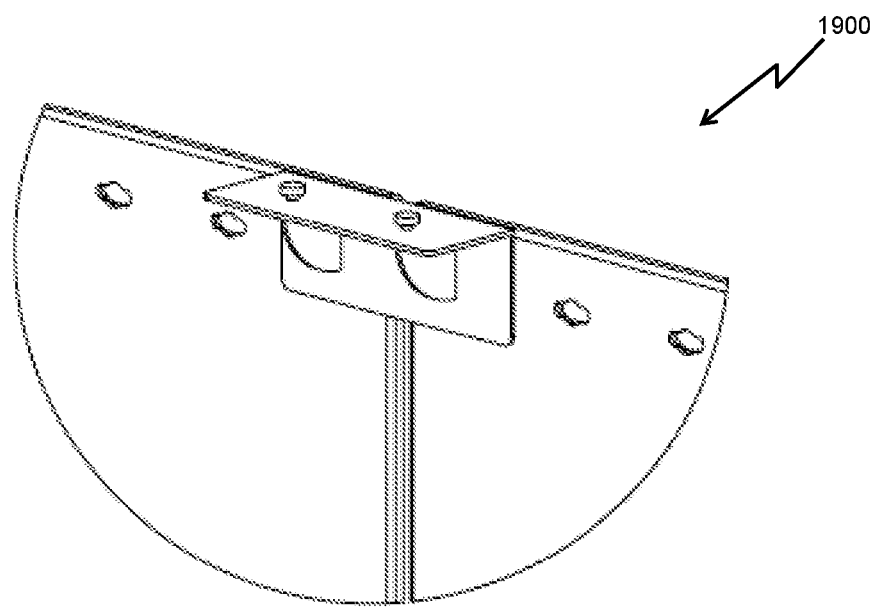
FIG. 19 illustrates a fastening system in another embodiment.

Referring now to FIGS. 19A-19B, another fastening system 1900 is illustrated according to a seventh embodiment. The fastening system 1900 includes brackets with steel pins that extend at right angles to respective flanges included in the bracket. Panels include keyhole slots separated by the distance that separates the pins. Different brackets can be provided to secure adjacent panels at right angles, in a planar configuration or a hinged configuration.

To assemble a structure using the fastening system 1900, adjacent panels are oriented in the desired configuration. The appropriate bracket is aligned such that the slots in the panels line up with a pin included in the bracket, respectively. The panels are secured together when the pins are seated in the respective slots using a sliding motion.

When employed in large scale play structures for children, the embodiments described herein provide for highly customized configurations that can evolve with a child as s/he grows, takes on new interests and gains skills. The customization can be supported through a number of different materials that might be used with these embodiments. For example, the panels and other components can be manufactured from plywood, solid wood and plastic. The building systems can include fabric, and removable/reusable self-adhesive fabric decals to allow for a further customized aesthetic design. The customization allows a child and parent to decide if they'd like to engage in truly open-ended play or not, and gives them ownership over the direction of their play. Removable and reusable fabric decals can give configurations a more specific look, such as the appearance of a stove burner, front loader washer/dryer, an oven, stones on a castle, or the side of a food truck. Decals not only provide customization in terms of objects or themes, but also in terms of color schemes. Smaller wood panels and furniture feet allow for a system to physically grow with a growing child, giving the product longevity. Depending on the embodiment, suction cups or separate t-post fasteners can be used to attach door handles, knobs, faucets and other smaller accessories to the structures, giving a child ownership over the location, appearance and functionality of their configurations. Select panels painted with a white board/dry erase or blackboard finish allow children to further customize their creations.

Figure 20:
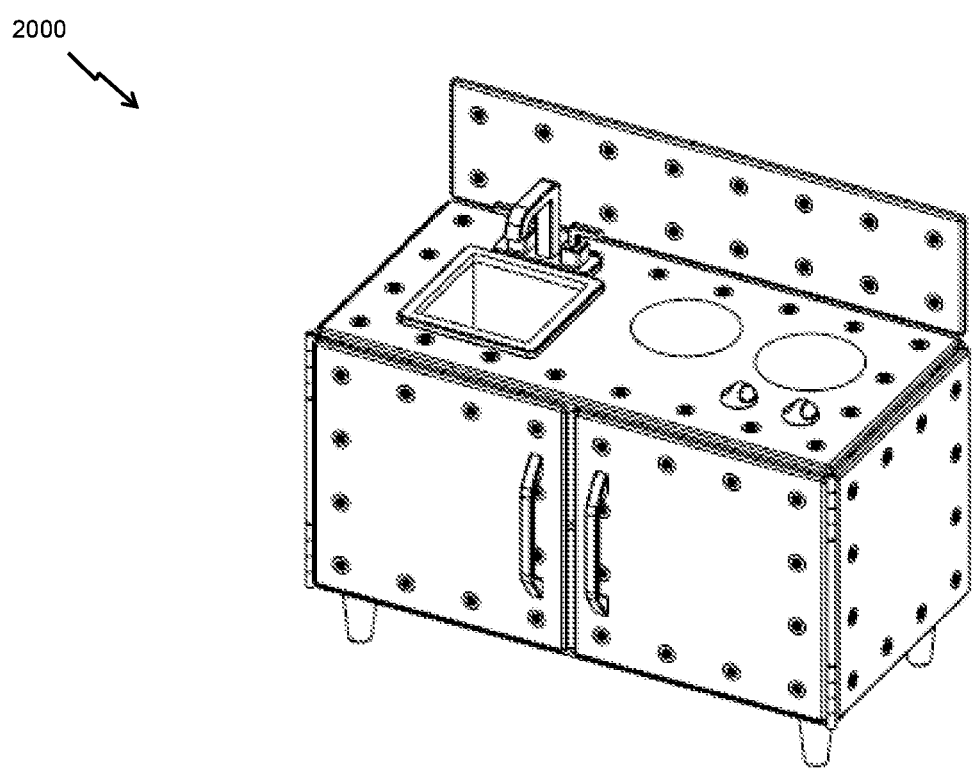
FIG. 20 illustrates a large scale play structure assembled in accordance with various embodiments.

Referring now to FIG. 20, an example of a large scale play structure is illustrated. According to this embodiment, the structure is assembled using the building components and fastening hardware illustrated and described with reference to FIGS. 3A, 3B and 8-13B. Accordingly, the large scale play structure illustrated and described with reference to FIG. 20 maintains ideal modularity. FIG. 20 illustrates a kitchen set 2000 including a stove top, sink, cabinets and backsplash. According to some embodiments, the legs included in the kitchen set include a T-post structure that allows the legs to be attached to the panels in the manner shown and described with reference to the fastening system illustrated and described with reference to FIGS. 8-11. According to some embodiments, the fastening hardware for accessories does not include a handle. Instead, the user grasps the accessory (for example, the leg) to rotate the accessory into a secured position.

Although the preceding is primarily described in the context of large scale play structures, those of ordinary skill in the art will understand in view of the disclosure herein that the embodiments of the building systems can be employed to assemble furniture having an ideal modularity. For example, embodiments of the panels and fastener systems illustrated and described herein can be employed to assemble tables, chairs, shelves, cabinets and other furniture having an ideal modularity. These building systems can be provided in kits that allow a user to assemble a first piece of furniture that can be modified with the addition of the other building components (panels and fastener) included in the kit. The first piece of furniture can be disassembled and the building components redeployed to build a second different piece of furniture that has ideal modularity.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for building large-scale play structures, the system comprising:
   a plurality of panels having a thickness, a planar-quadrangle shape including a length, a width, a first planar surface, a second planar surface opposite the first, four chamfered edges with a set of holes located along each edge, the holes provided as through holes extending from the first planar surface to the second planar surface and located at a fixed interval relative to one another, the fixed interval providing a unit of length, the plurality of panels including four panels including a first panel, a second panel, a third panel and a fourth panel;
   a plurality of fixed-location fastening elements located within the holes; and
   a plurality of movable fastening elements each including a hand-grip to allow the respective movable fastening element to be moved between an unsecured position and a secured position without the use of tools when received by any one of the plurality of fixed-location fastening elements,
   wherein each set of holes includes at least a first hole located at a first end of the respective set of holes, a second hole located at a second end of the respective set of holes and at least one intermediate hole located between the first hole and the second hole along an edge of a central region of the respective panel in which the set of holes is located,
   wherein the plurality of panels includes a first panel, a second panel, a third panel, a fourth panel and a fifth panel,
   wherein the first panel, the second panel, the third panel and the fourth panel are configured to assemble at right angles such that the four panels are secured together to form a hollow quadrangle-shaped structure when the assembled-panels are viewed edgewise,
   wherein the system is configured to attach the fifth panel orthogonally to both a central region of the first panel and a central region of the second panel using intermediate holes included in each of the first panel and the second panel, respectively, to divide the hollow quadrangle-shaped structure into two hollow compartments,
   wherein a distance measured from an outside plane formed by the first panel to an outside plane formed by the second panel provides a first dimension, the second panel located opposite the first panel in the structure,
   wherein a distance measured from an outside plane formed by the third panel to an outside plane formed by the fourth panel provides a second dimension, the third panel located opposite the fourth panel in the structure, and
   wherein the first dimension equals an integer multiple of the unit of length plus the thickness, and
   wherein the second dimension equals an integer multiple of the unit of length plus the thickness.

2. The system of claim 1, wherein the length of each of one of the respective plurality of panels and the width of each one of the respective plurality of panels equals the unit of length or an integer multiple thereof less a third dimension substantially equal to the thickness.

3. The system of claim 1, wherein a chamfer included in each of the four chamfered edges for each of one of the respective plurality of panels is provided to a depth of substantially one half of the thickness.

4. The system of claim 3, wherein the system is configured for the plurality of panels to be connected to one another at acute angles from substantially 60 degrees to substantially 90 degrees, and
   wherein the chamfer included in each of the four chamfered edges for each of one of the respective plurality of panels is substantially 30 degrees.

5. The system of claim 3, wherein the system is configured for the plurality of panels to be connected to one another at angles from substantially 45 degrees to substantially 90 degrees, and
   wherein the chamfer included in each of the four chamfered edges for each of one of the respective plurality of panels is substantially 45 degrees.

6. The system of claim 1, wherein each of the four chamfered edges for each one of the respective plurality of panels includes a planar surface centrally located on each of the four chamfered edges, the planar surface having a first edge located on a first side of the planar surface, a second edge located on a second side of the planar surface,
   wherein a first chamfered edge is located adjacent the first edge, and
   wherein a second chamfered edge is located adjacent the second edge.

7. The system of claim 6, wherein the plurality of fixed-location fastening elements include a first component configured to insert in a hole included in the set of holes from a first direction and a second component configured to insert in the hole included in the set of holes from a second direction opposite the first,
   wherein the first component includes a first plurality of resilient members configured to engage in locking arrangement with the second element with the first component pressed into engagement with the second component within the hole.

8. The system of claim 7, wherein the second component includes a second plurality of resilient members configured to engage in locking arrangement with the first element with the first component pressed into engagement with the second component within the hole.

9. The system of claim 6, wherein the plurality of fixed-location fastening elements include inserts secured in a fixed rotational position within the set of holes, respectively, and
   wherein the plurality of movable fastening elements each include a post including a t-shaped element located at a distal end of the post configured such that a rotation of movable fastening elements when inserted in an insert moves the moveable fastening element between a secured and an unsecured attachment with the insert.

10. The system of claim 9, further comprising a plurality of brackets configured to provide an attachment of the first panel to the second panel,
    wherein each of the plurality of brackets include at least two moveable fastening elements secured thereto.

11. The system of claim 10, wherein each of the plurality of brackets include a first flange and a second flange oriented at a fixed angle relative to one another, the fixed angle determining an angle of attachment of the first panel and the second panel when secured to one another with the respective bracket selected from the plurality of brackets.

12. The system of claim 1, wherein the plurality of fixed-location fastening elements include a component integral to the respective panel in which it is located.

13. The system of claim 12, wherein the fixed-location fastening element including the component integral to the respective panel in which it is located is molded as an integral component of the respective panel.

14. The system of claim 12, wherein the plurality of movable fastening elements each include a post including a t-shaped element located at a distal end of the post configured such that a rotation of movable fastening elements when inserted in the fixed-location fastening element moves the moveable fastening element between a secured and an unsecured attachment with the fixed-location fastening element.

15. A method for building large-scale play structures having an ideal modularity, the method comprising:
   providing a plurality of panels having a thickness, a planar-quadrangle shape including a length, a width, a first planar surface, a second planar surface opposite the first, and four chamfered edges with a set of holes located along each edge, the holes provided as through holes extending from the first planar surface to the second planar surface and located at a fixed interval relative to one another, the fixed interval providing a unit of length, a fixed-location fastening element located in each of the holes, respectively;
   providing a plurality of movable fastening elements each including a hand-grip to allow the respective movable fastening element to be moved between an unsecured position and a secured position without the use of tools when received by any one of the plurality of fixed-location fastening elements;
   including in in the set of holes at least a first hole located at a first end of the respective set of holes, a second hole located at a second end of the respective set of holes and a plurality of intermediate holes located between the first hole and the second hole along an edge of a central region of the respective panel in which the set of holes is located;
   including in the plurality of panels at least a first panel, a second panel, a third panel, a fourth panel, and a fifth panel; and
   employing the moveable fastening elements to secure the plurality of the panels to one another to provide a structure that has an overall height and an overall width, the structure including a first pair of panels selected from the plurality of panels oriented one above the other, a second pair of panels selected from the plurality of panels located at the same elevation and secured at right angles to the first pair of panels and a single panel selected from the plurality of panels oriented parallel to the second pair of panels and attached orthogonally to the first pair of panels using the intermediate holes included in each of the panels included in the first pair of panels, respectively,
   wherein the structure defines an overall quadrangle-shape divided into two hollow compartments by the single panel when the assembled panels are viewed edgewise, and
   wherein the overall height and the overall width each provide a respective dimension that is an integer multiple of the unit of length plus the thickness.

16. The method of claim 15, wherein each of the panels includes an ideal plane, and wherein the method further comprises securing the plurality of panels to one another at an intersection of their respective ideal planes.

17. The method of claim 16, further comprising providing a plurality of brackets including a first flange and a second flange with a first moveable fasting element selected from the plurality of movable fastening elements secured to the first flange and a second moveable fastening element selected from the plurality of movable fastening elements secured to the second flange.

18. The method of claim 17, further comprising providing the plurality of brackets including a fixed angle between the first flange and the second flange, the fixed angle being an acute angle.

19. The method of claim 17, further comprising coupling the first flange and the second flange with a hinge configured to allow a movement of panels secured to one another with a bracket selected from the plurality of brackets and including the hinge to be moved through a range of motion including acute angles.

* * * * *